United States Patent
Chen et al.

(10) Patent No.: US 7,084,881 B1
(45) Date of Patent: Aug. 1, 2006

(54) METHOD AND APPARATUS FOR IMPROVED COLOR CORRECTION

(75) Inventors: Kok Chen, Sunnyvale, CA (US); Gabriel G. Marcu, San Jose, CA (US); Steve Swen, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 197 days.

(21) Appl. No.: 10/637,246

(22) Filed: Aug. 7, 2003

Related U.S. Application Data

(63) Continuation-in-part of application No. 10/112,281, filed on Mar. 29, 2002, now Pat. No. 6,844,881.

(51) Int. Cl.
*G09G 5/02* (2006.01)
*G06K 9/00* (2006.01)

(52) U.S. Cl. ...................................... 345/589; 382/167
(58) Field of Classification Search ................ 345/601, 345/589; 382/167; 358/1.9
See application file for complete search history.

(56) References Cited

U.S. PATENT DOCUMENTS

| | | | |
|---|---|---|---|
| 5,381,349 A * | 1/1995 | Winter et al. ................ 382/167 |
| 5,412,433 A * | 5/1995 | Holland et al. ............. 348/650 |
| 5,459,678 A | 10/1995 | Feasey |
| 5,483,259 A | 1/1996 | Sachs |
| 5,512,961 A | 4/1996 | Cappels, Sr. |
| 5,546,105 A | 8/1996 | Leak |
| 6,285,350 B1 | 9/2001 | Ijntema et al. |
| 2002/0018129 A1* | 2/2002 | Ikeda ........................ 348/223 |
| 2002/0180998 A1* | 12/2002 | Wu ............................. 358/1.9 |
| 2003/0058202 A1 | 3/2003 | Evanicky |

OTHER PUBLICATIONS

Peter G. Engeldrum and John L. Ingraham: "Analysis of White Point and Phosphor Set Differences of CRT Displays", *Color Research and Application*, vol. 15, No. 3, pp. 151- 155, Jun. 1990.

Steven M. Boker: "CIE Colorimetric Standard Observer Model", http://kiptron.psyc.virginia.edu/steve_boker/ColorVision2/node17.html, Feb. 1995.

Adobe Systems Incorporated: "Color Models—CIEXYZ", http://www.adobe.com/support/techguides/color/colormodels/ciexyz.html, 2000.

Charles A. Poynton: "*Gamma* and its Disguises: The Nonlinear Mappings of Intensity in Perception, CRTs, Film and Video", *SMPTE Journal*, Dec. 1993, pp. 1099-1108.

* cited by examiner

*Primary Examiner*—Richard Hjerpe
*Assistant Examiner*—Aaron M. Richer
(74) *Attorney, Agent, or Firm*—Blakely, Sokoloff, Taylor & Zafman LLP

(57) ABSTRACT

Methods and apparatuses for color correction that includes gamma correction. One embodiment of the present invention pre-processes the native device information of a color device (e.g., a color display device) to generate pseudo-native device information such that when a single, unique function is applied on the pseudo-native device information, a customized look up table for gamma correction in a video card is generated. The customized look up table is calibrated for the optimization of color rendering for skin tone in one region in a color space while maintaining the gray colors for the user interface elements in another region in the color space.

9 Claims, 20 Drawing Sheets

METHOD AND APPARATUS FOR IMPROVED COLOR CORRECTION

This application is a continuation-in-part (CIP) application of a U.S. patent application Ser. No. 10/112,281, filed Mar. 29, 2002 now U.S. Pat. No. 6,844,881, entitled "Method and Apparatus for Improved Color Correction".

FIELD OF THE INVENTION

The invention relates to color correction, more particularly to tone ("gamma") correction for devices with multiple color channels.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Apple Computer, Inc., 2003.

BACKGROUND

The light intensity (Y) produced by a Cathode Ray Tube (CRT) monitor is controlled by the voltage input. A transfer function of the CRT monitor is the light intensity (Y) produced by a Cathode Ray Tube (CRT) monitor varying with respect to the voltage input (V). Typically, the transfer function of a CRT monitor is in the form of a power law (for example, $Y=aV^\gamma$, where a is a constant). The exponent of the power law, $\gamma$, is frequently referred to as the gamma of the CRT monitor. The theoretical value of the gamma of a CRT monitor, dictated by the physics of the electron gun of a CRT monitor, is around 2.5. Thus, a linear variation in voltage input (V) results in a nonlinear variation in light intensity (Y) in the form of a power law. On a color CRT monitor, red, green and blue phosphors are driven independently by corresponding signals. The light intensities produced by the phosphors in response to the corresponding signals follow the same power law.

A computer system may have a nonlinear built-in unit that is closely associated with the CRT monitor (e.g., a graphics controller, or circuitry in the monitor) such that the light intensity produced by the CRT monitor varies with respect to the input digital signal to the display device in the form of a power law controlled by a gamma different from the gamma for the CRT monitor. For example, a typical Apple Macintosh display has a gamma close to 1.8; and a typical PC display has a gamma close to 2.2. Thus, different display devices have different nonlinearities (different gammas) in their transfer functions.

In this description, the transfer function per channel of the uncompensated device is referred as native transfer function. The native transfer function is assumed to be different from the desired device transfer function, that is referred as target transfer function. The process of pre-compensating for the nonlinearity in the native transfer function of a display device to a target transfer function is known as gamma correction. With a gamma correction, an input digital signal is mapped by a correction function to a corrected signal such that, when the corrected signal is applied to the display system, the light intensity produced by the display device varies with respect to the input digital signal in the form of a power law with a target gamma. With the gamma correction, the display system behaves as if the transfer function of the system has the target gamma. In case of multiple color channel devices, gamma correction is a unidimensional correction applied per channel. This means that the input signal from one channel is mapped into an output signal for that channel. The correction function is computed based on the native transfer function of the device measured as a correlate of the intensity of light (luminance or density) with the input signal. The intensity of light is used only, neglecting the chrominance information.

In general, a gamma correction maps input signals representing the intensity of a light to corrected signals using a nonlinear function. Gamma corrections may be applied to signals for display devices, as well as signals to or from other color related devices, such as scanners, printers, video cameras, and others. Thus, a gamma correction changes or encodes the nonlinearity in signal intensity in each of the color signals using a nonlinear unidimensional mapping function for each channel.

On a color CRT display, since the native transfer functions of the three different color components (e.g., red, green and blue in a RGB color space) of a CRT display follow the same power law, a single parameter gamma correction in the form of a power law can be used to map the input signals of each color channel to the corrected signals.

However, some display devices, such as twisted nematic Thin-Film Transistor Liquid-Crystal Displays (TFT LCD), have a similar transfer functions for different color components. Thus, different unidimensional correction functions are required to correct the asimilar transfer functions to similar target transfer functions. A conventional gamma correction applies different unidimensional correction functions to the input signals for different color components; and the different unidimensional correction functions are derived independently from each other from the native transfer functions and the target transfer functions. Not only that, but the TFT LCD devices show a different native transfer function than a power law requiring table based gamma compensation. Typically, these unidimensional correction functions are in the form of unidimensional look-up tables that map the input digital signals to the corrected signals. Because of the asymmetry of the RGB channels, the gray balance of those devices is poor. Due to the human visual system sensitivity to color differences especially for neutral colors (grays), small asymmetries in the color balance associated with gray color rendition, is usually perceived as a hue shift over the grays. This hue shift is known as color cast and is visible in the form of bluish, greenish or reddish grays depending on the color asymmetry on that device. Additionally, in many cases, TFTLCD devices may show a variation of the chromaticity of the primary colors with the input signal. In the case of gamma correction per channel based on light intensity only per channel, when all compensated channels are combined to represent a gray, the combined compensations may cause a noticeable hue shift for different input signal levels.

SUMMARY OF THE DESCRIPTION

Methods and apparatuses for color corrections are described here. Some of the embodiments of the present invention are summarized in this section.

One embodiment of the present invention pre-processes the native device information of a color device (e.g., a color display device) to generate pseudo-native device information such that when a single, unique function is applied on the pseudo-native device information, a customized look up table for gamma correction in a video card or other display driver system is generated. The customized look up table is calibrated for the optimization of color rendering for skin tone in one region in a color space while maintaining the gray colors for the user interface elements in another region in the color space.

In one aspect of the present invention, a method to determine color correction for a device includes: calibrating a plurality of colors produced on the device to generate color correction functions respectively for color components of a first color space, where the plurality of colors are associated with a color parameter having a range of possible values such as a plurality of values (e.g., a color component of the first color space, luminance). In one example, the color correction functions include look up tables for gamma correction; and, the plurality of colors correspond to more than one point in a chromaticity diagram. In one example, the plurality of colors include grays (e.g., including white) in a first range of the color parameter and skin tone colors in a second range of the color parameter (e.g., the luminance levels of the skin tone colors are lower than the luminance levels of the grays). In one example, the plurality of colors are calibrated through reducing differences between the plurality of colors on the device with respect to one or more color points in a second color space (e.g., in an xy color space, where the first color space is an RGB color space). In one example, both luminance and chromaticity values for characterizing the device are used in calibrating the plurality of colors. In one example, the device displays colors; the plurality of colors are calibrated through modifying values of the color components interdependently; and, the plurality of colors are calibrated through displaying the plurality of colors on the device for visual inspection.

In another aspect of the present invention, a method to determine color correction for a device includes: combining first color correction functions and second color correction functions to generate third color correction functions respectively for color components of a first color space; where the first color correction functions are calibrated for the device for a first plurality of colors that are associated with a color parameter capable of having a plurality of values (e.g., grays in a first range of the color parameter and skin tone colors in a second range of the color parameter). In one example, the second color correction functions are calibrated for the device for a second plurality of colors that are associated with a color parameter capable of having a plurality of values. In one example, combining the first and second color correction functions includes: normalizing the first and second color correction functions with respect to fourth color correction functions; and, averaging the normalized first and second color correction functions with weights to generate the third color correction functions.

In another aspect of the present invention, a method for color correction includes: determining pseudo-native device information for a color device from first color correction functions; wherein, when applied, a predetermined algorithm generates the first color correction functions from the pseudo-native device information. In one example, when applied, the predetermined algorithm generates second color correction functions from the native device information that specifies color characteristics of the color device. In one example, the color device displays colors; and, the native device information includes data specifying transfer functions of the device. In one example, a plurality of colors is calibrated on the device to generate the first color correction functions respectively for color components of a first color space, where the plurality of colors are associated with a color parameter capable of having a plurality of values. In one example, the plurality of colors include grays in a first range of the color parameter and skin tone colors in a second range of the color parameter.

The present invention includes methods and apparatuses that perform these methods, including data processing systems that perform these methods, and computer readable media which contain instructions which when executed on data processing systems cause the systems to perform these methods.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
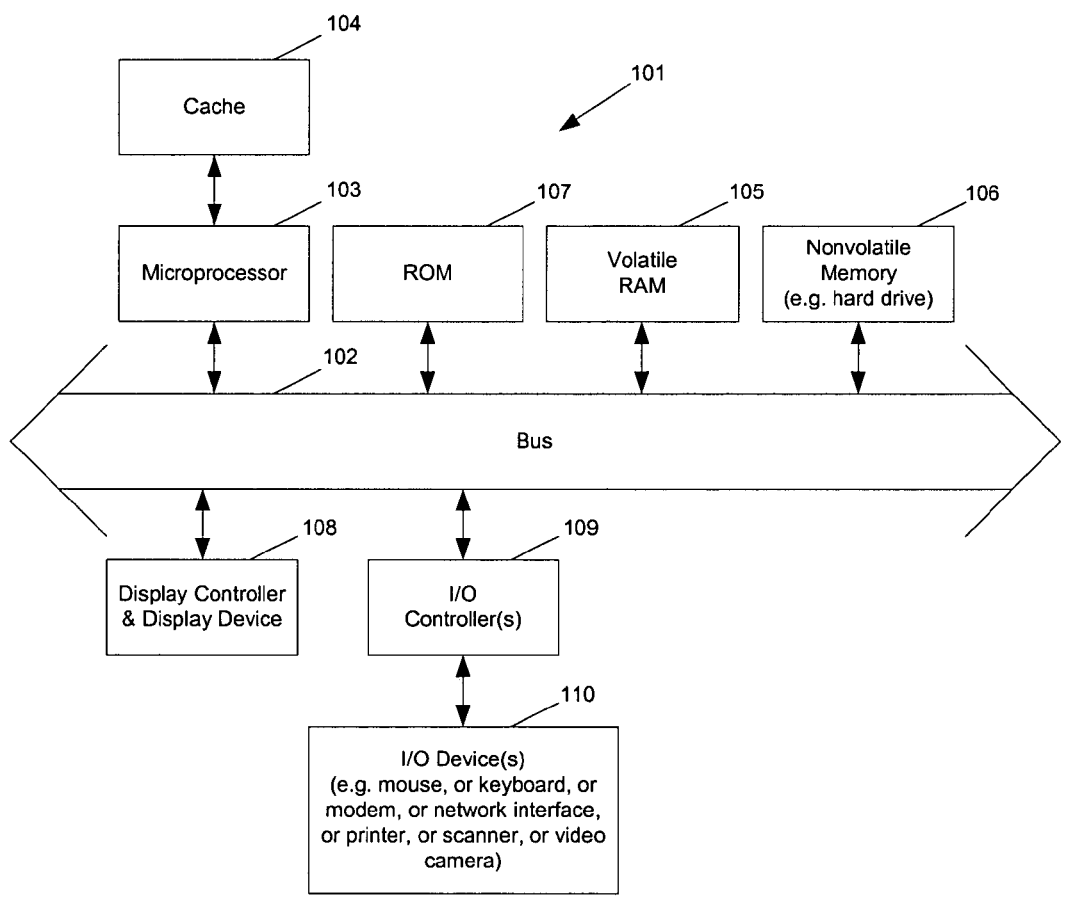
FIG. 1 shows a block diagram example of a data processing system that may be used with the present invention.

FIG. 1 shows one example of a typical computer system that may be used with the present invention. Note that while FIG. 1 illustrates various components of a computer system, it is not intended to represent any particular architecture or manner of interconnecting the components as such details are not germane to the present invention. It will also be appreciated that network computers and other data processing systems that have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 that is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) that requires power continually in order to refresh or maintain the data in the memory. The non-volatile memory 106 is typically a magnetic hard drive or a magnetic optical drive or an optical drive or a DVD RAM or other type of memory systems that maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 2:
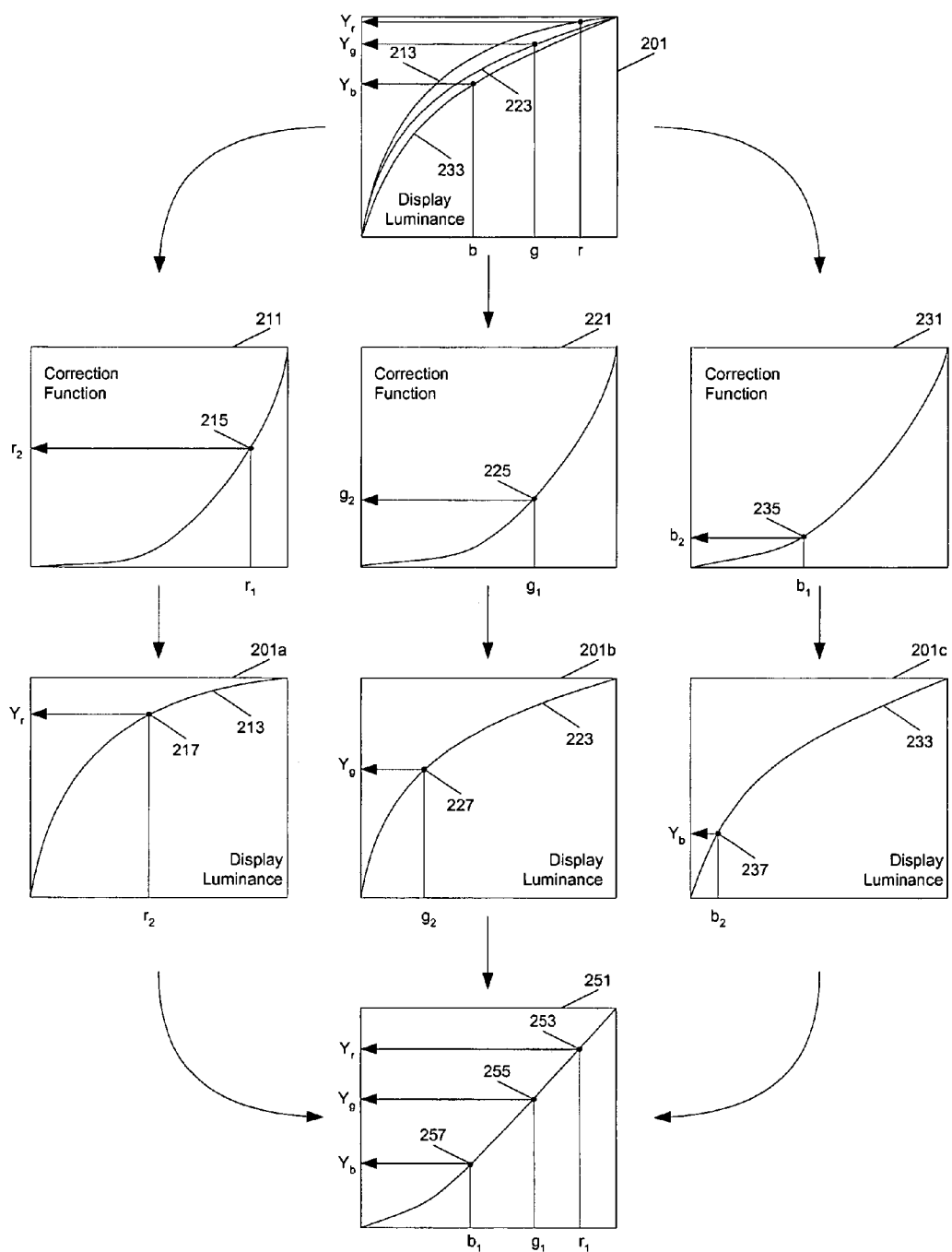
FIG. 2 illustrates a typical method for color gamma correction.

FIG. 2 illustrates a typical method for color gamma correction. When normalized, the same input signal for different color components results in light of different luminance values on a typical TFT LCD display. For example, curves 213, 223 and 233 in graph 201 correspond respectively to transfer functions for Red (R), Green (G) and Blue (B) components in a RGB color space. For example, when the Blue signal is b, curve 233 shows the luminance of the display ($Y_b$) in the absence of the Red and Green signals. In order to correct the transfer functions in graph 201 to the normalized target transfer functions in graph 251, different unidimensional correction functions, shown in graphs 211, 221, and 231, are derived independently from the corresponding native transfer functions in graph 201. Correction function 215 corrects the input Red signal from $r_1$ to $r_2$; correction function 225 corrects the input Green signal from $g_1$ to $g_2$; and correction function 235 corrects the input Blue signal from $b_1$ to $b_2$. When the corrected signal levels $r_2$, $g_2$ and $b_2$ are applied to the display, the native transfer functions of the display (in graph 201) determine the luminance of the light produced on the display. Graphs 201*a*, 201*b* and 201*c* show the transfer functions 213, 223 and 233 for the Red, Green, and Blue signals respectively. Signal levels $r_2$, $g_2$ and $b_2$ correspond to points 217, 227 and 237 on the native transfer functions 213, 223 and 233 and, therefore, to luminance levels $Y_r$, $Y_g$, and $Y_b$ respectively, which in turn correspond to the luminance levels at points 253, 255 and 257 in graph 251. Thus, with the gamma correction functions 215, 225, and 235 illustrated in graphs 211, 221 and 231, the display system exhibits the normalized transfer functions as shown in graph 251, where all the target transfer functions for the three color components coincide with each other. Thus, from the target transfer functions as shown in graph 251, one can derive the correction functions 215, 225 and 235 independently from the native transfer functions 213, 223 and 233 respectively. For instance, for input Blue signal level $b_1$, luminance level $Y_b$ is determined from the target transfer function 257 in graph 251. From the native transfer function 233 in graph 201*c*, the corrected signal level $b_2$ is determined from point 237, which has the required luminance level $Y_b$. Thus, point 235 on the correction function for Blue in graph 231 is determined.

Due to the similar transfer functions for RGB color components for a color CRT display, such a gamma correction operation ensures inherently the stability of the white point corresponding to digital signals for various gray levels. Thus, the colors produced on the CRT display by the digital signals corresponding to various gray levels coincide with a reference white point, or stay in the vicinity of the reference white point. However, when the conventional gamma correction is performed for twisted nematic TFT LCD displays, the white point of the display varies when the input gray level varies from white to black, due to the asymmetry of the transfer functions for different color components.

At least one embodiment of the present invention seeks to perform gamma corrections by utilizing both the luminance and the chromaticity properties of a display device. The correction functions for different color components are derived interdependently from the luminance and the chromaticity data of the display device such that gamma corrections maintain a substantially consistent white point over a plurality of gray levels from a white to a black.

Figure 3:
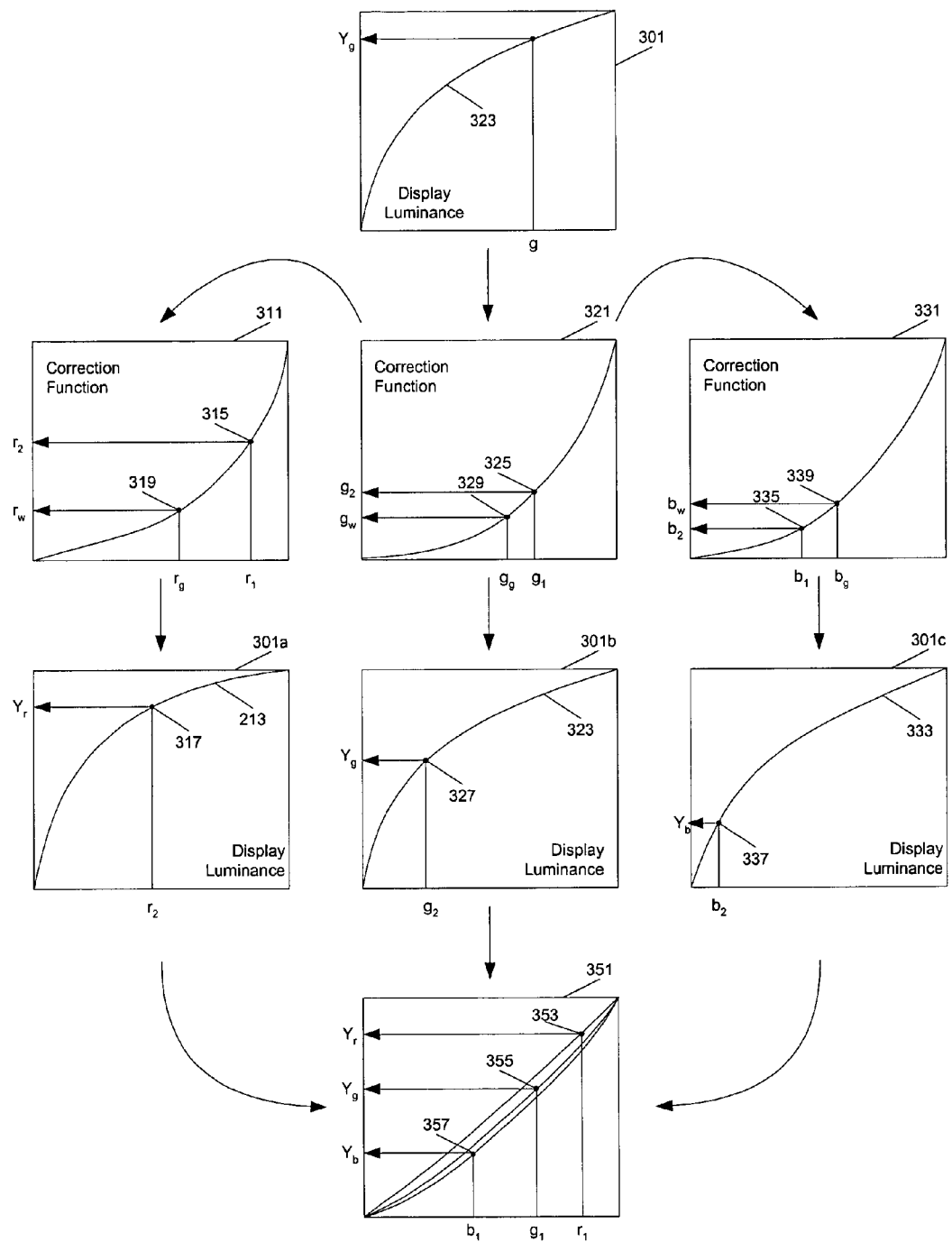
FIG. 3 illustrates a method to perform gamma correction according to one embodiment of the present invention.

FIG. 3 illustrates a method to perform gamma correction according to one embodiment of the present invention. In this embodiment, a correction function is first derived for one of the color components (e.g., from the native transfer function of the device). For example, a correction function for color component Green is derived from the native transfer function 301 in graph 301. Green is preferred, since the dominant contribution to the luminance of a gray is from the component Green. Thus, correction function 325, illustrated in graph 321, can be determined from the native transfer function 323 and from the target transfer function 355 in graph 351, using a method similar to that described above for determining correction function 225 in graph 221. However, the correction functions for the other components are derived from the correction function 325 to ensure the stability of the white point corresponding to digital signals for various gray levels. Instead of being derived from the target transfer function and the corresponding native transfer functions, the correction functions 315 and 335 are derived from the correction function 325 to maintain a substantially consistent white point over a plurality of gray levels from a white to a black. For example, for a gray level corresponding to input Red, Green and Blue levels $r_g$, $g_g$ and $b_g$, the color difference between a white point and the color produced by corrected color levels $r_w$, $g_w$ and $b_w$ is reduced or minimized. Since the correction function 325 determines the corrected Green level $g_w$, the corrected red and blue levels ($r_w$ and $b_w$) can be adjusted such that the color produced by the corrected color levels ($r_w$, $g_w$ and $b_w$) corresponds to a white point, or is as close to a white point as possible. When corrected color levels for a plurality of gray levels are determined, correction functions 315 and 335 can be determined. When the correction functions 315 and 335, derived from the correction function 325 with the criterion to minimize the color difference between the color produced by the corrected color levels for grays and a white point, are used on the display system, the combination of the correction functions and the native transfer function typically results in different target transfer functions for different color components. For example, the target transfer functions 353, 355 and 357 for color components Red, Green and blue respectively, as shown in graph 351, do not coincide with each other.

Figure 4:
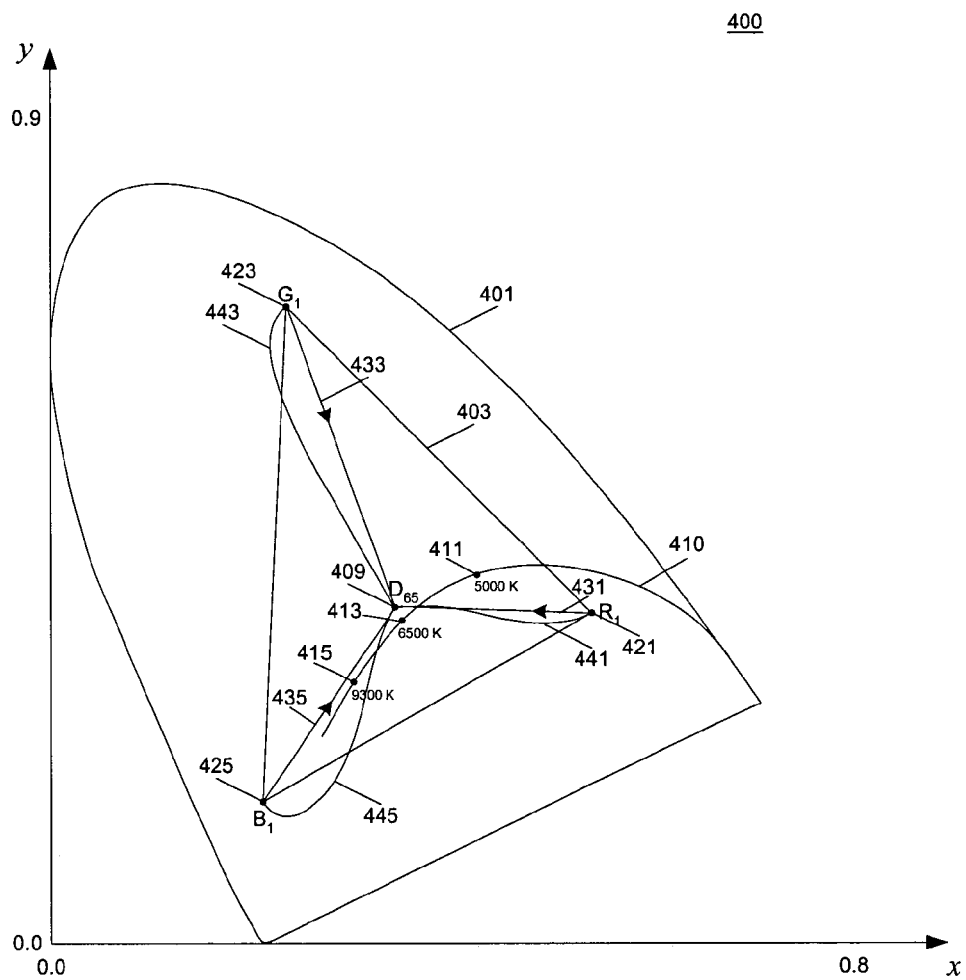
FIG. 4 illustrates a chromaticity diagram showing display characteristics of various devices.

FIG. 4 illustrates a chromaticity diagram showing display characteristics of various devices. In a CIE (Commission International d'Eclairage) 1931 chromaticity diagram, the horseshoe-shaped color space 401 represents the colors visible to a standard observer. Curve 410 represents the black body curve, which represents the color of the light emitted by a theoretical "black body at different absolute temperatures (in degrees Kelvin). The light emitted from the black body represents white light with different hues, ranging from yellow-reddish at low temperatures (e.g., 5000 K at point 411) to bluish at high temperatures (e.g., 9300 K at point 415). Point 413 on the black body curve represents the white light emitted from a black body at 6500 K. Slightly off the black body curve, point 409 ($D_{65}$) is the reference white for NTSC television.

In the absence of green and blue signals, a display produces a saturated red when the red signal reaches the maximum level. The saturated red is represented by point 421 ($R_1$). Similarly, points 423 ($G_1$) and 425 ($B_1$) represent the saturated green and blue. In the absence of green and blue signals, a CRT display may produce a different red color when the red signal is not at the maximum level. As the red signal reduces from the maximum level to zero, the red color produced by the CRT display under white ambient light typically stays at or near point $R_1$ (421) and then moves quickly along path 431 toward white point $D_{65}$ (409). Similarly, the light produced by the green signal stays at or near point $G_1$ (423) and moves quickly toward $D_{65}$ (409) along path 433, as the green signal reduces from the maximum level to zero; and the blue light moves from $B_1$ (425) toward $D_{65}$ (409) along path 435. Thus, when balanced input signals for a gray is applied on the display, the combined red, blue and green light produced by the CRT display typically has a stable white point on or near the native white, which in this example was selected for illustration purposes as $D_{65}$ (409). Since the color produced by the CRT monitor is the mixture of the light emitted from the red, green and blue phosphors, triangular 403 represents the colors that can be produced by the CRT monitor.

However, some display devices, such as twisted nematic TFT LCD displays, have different display characteristics. In the absence of green and blue signals, the red light emitted from the display moves along a different path, such as path 441, toward the white point $D_{65}$, as the red signal reduces from the maximum level to zero. Instead of staying at or near $R_1$ (421), the red light moves near the saturated red. Similarly, the green and blue light move along paths 443 and 445 respectively. As a result, when balanced red, blue and green signals for a gray are applied on the display, the color produced by the signals does not coincide with the white point $D_{65}$. When the gray level changes from a white to a black, the color produced by the signals moves around the reference white point.

In one scenario, balanced red, blue and green signals for a display device produce a white point consistent gray. However, due to the difference in native transfer functions, conventionally gamma corrected signals from balanced red, blue and green signals are not unbalanced, resulting in a white point inconsistent gray after gamma correction. Because native transfer functions are different, a conventional method requires different correct functions $f_1$, $f_2$, $f_3$ for RGB. Thus, balanced uncorrected signals (r=g=b) result in unbalanced corrected signals $f_1$ (r), $f_2$(g), and $f_3$(b).

In another scenario, a white point consistent gray must be created on a display device with unbalanced red, blue and green signals. In this case, conventional approach for gamma correction, in general, cannot produce signals for generating white point consistent gray levels.

Thus, at least one embodiment of the present invention seeks to gamma correct input signals such that the gamma corrected signals for a gray produces a white point consistent color on a target display device.

Figure 5:
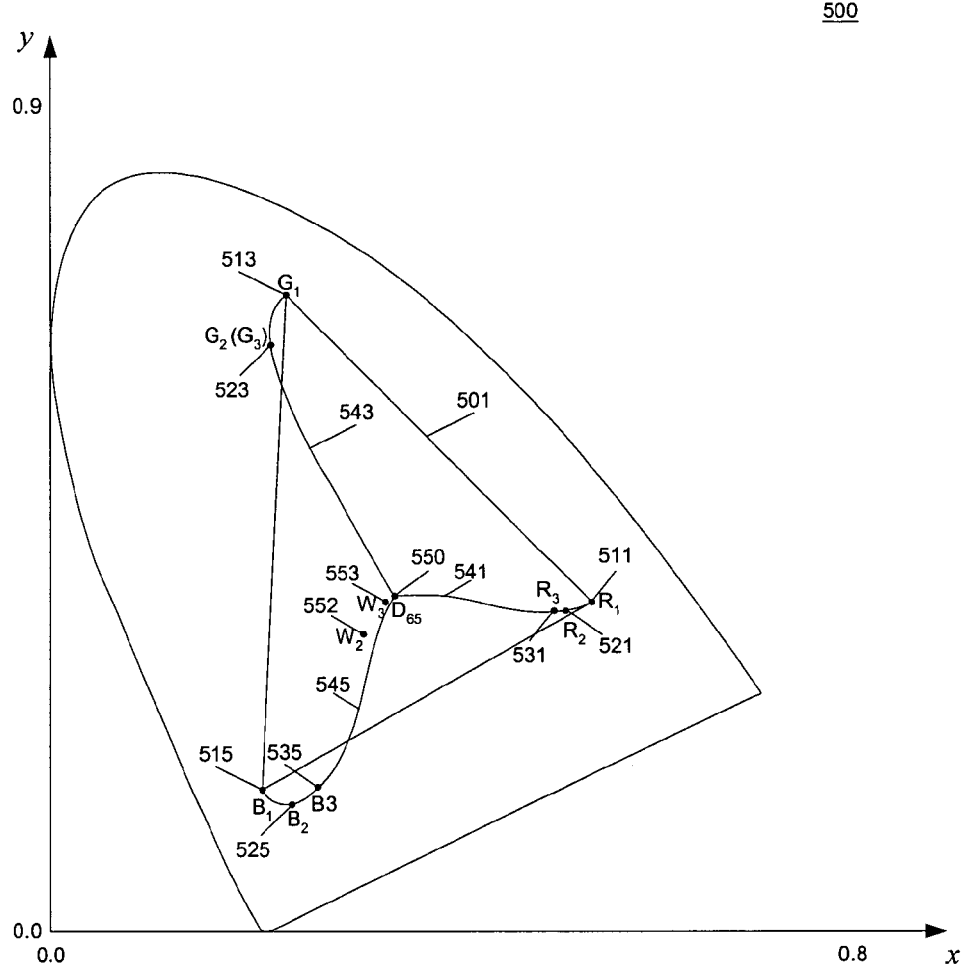
FIG. 5 illustrates a method to determine color components corresponding to colors that are close to white points according to one embodiment of the present invention.

FIG. 5 illustrates a method to determine color components corresponding to colors that are close to white points according to one embodiment of the present invention. In FIG. 5, $R_1$ (511), G1 (513) and $B_1$ (515) represent the saturated red, green and blue produced by a display; paths 541, 543 and 545 represent the colors of the red, green and blue light produced by the display at different levels of input signals; and $D_{65}$ (550) represents an example of the target white point. Using a conventional approach, red, green and blue signals for a gray is corrected independent from each other to produce colors represented by $R_2$ (521), $G_2$(523) and $B_2$ (525). The mixture of the red, green and blue light represented by $R_2$ (521), $G_2$(523) and $B_2$ (525) corresponding to equal Red, Green, Blue signals produces a color $W_2$ (552), which is very different from the target white $D_{65}$. According to one embodiment of the present invention, the signal for Green is corrected to produce green light $G_2$ (523). However, the signals for red and blue are corrected such that the corrected signals produce red $R_3$ (531) and blue $B_3$ (535) on the display. Thus, the mixture of $R_3$ (531), $G_2$ (523) and $B_3$ (535) produces $W_3$ (553), which is substantially consistent with the target white point $D_{65}$. Preferably, $W_3$ (553) coincides with the white point $D_{65}$. However, on some devices or for some gray levels generating colors close to black it may not be possible to adjust $R_3$ and $B_3$ along paths 541 and 545 such that $W_3$ (553) coincides with the target white point $D_{65}$.

Notice that a color difference between two colors can be quantified using the distance between the points representing the colors in a chromaticity diagram. This metric was used because for most TFT LCD devices it is possible to adjust $R_3$ and $B_3$ along paths 541 and 545 such that $W_3$ (553) physically coincides with the target white point. A proper metric system can also be used in computing the distance. For example, in one metric system, such as a Stiles system, if two neighboring points are just noticeably different colors on the chromaticity diagram, the line element connecting the two points has the same constant value along its length. When such a metric system is used, a minimization process can produce a better solution than that produced without using a metric system. Color difference formula such as ΔE defined in CIE L*a*b* or CIE L*u*v* can be also used. Also color difference can be estimated visually and minimized through visual feedback. In such implementation Red and Green adjustments are used to adjust $R_3$ and $B_3$ along paths 541 and 545 such that the best visual match is obtained between the target white point and the gray white point resulted by the color mixture of Red, Green and Blue color components. Such implementation can be used in a visual gamma correction application.

Figure 6:
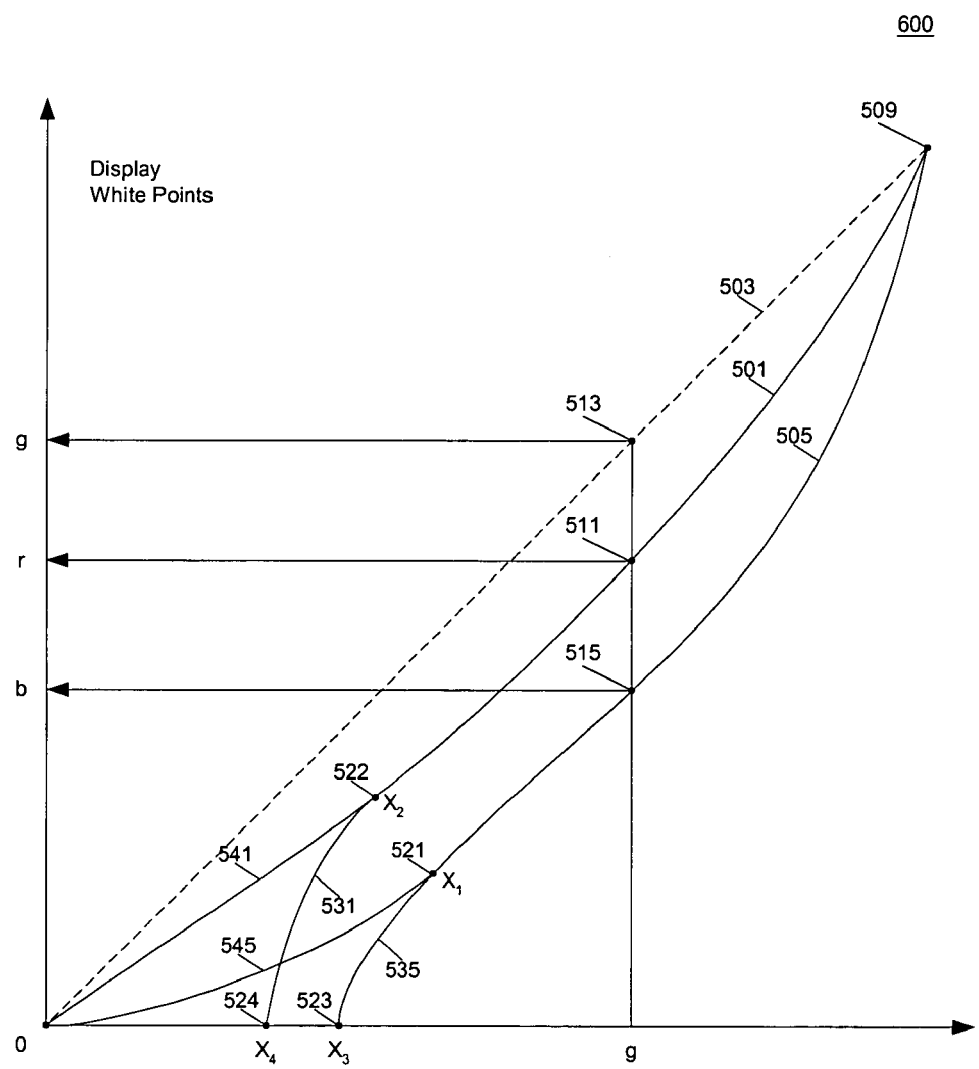
FIG. 6 illustrates a method of generating color components that correspond to colors that are close to white points according to one embodiment of the present invention.

FIG. 6 illustrates a method of generating color components that correspond to colors that are close to white points according to one embodiment of the present invention. For a given green signal level g, curves 501, 503, 505 show the signal levels for red, green and blue on points 511, 513 and 515 that can produce on the display a color that coincides with a target white point on a chromaticity diagram. Due to the limitation of the display device, at a certain range of green signal, it may not be possible to have corresponding red and blue signal levels that can produce a white point consistent gray on the device. For example, white point consistent signal levels for red and blue may follow curves 531 and 535 after points $X_2$ (522) and $X_1$ (521). Thus, it may be desirable to construct curves 541 and 545 such that the produced colors for the gray levels are substantially consistent with the white point while the overall curves are monotonic, varying substantially smoothly. The correction for monotonicity and smoothness is however applied for very dark grays, close to a black color where the human visual system sensitivity to color is much reduced.

Figure 7:
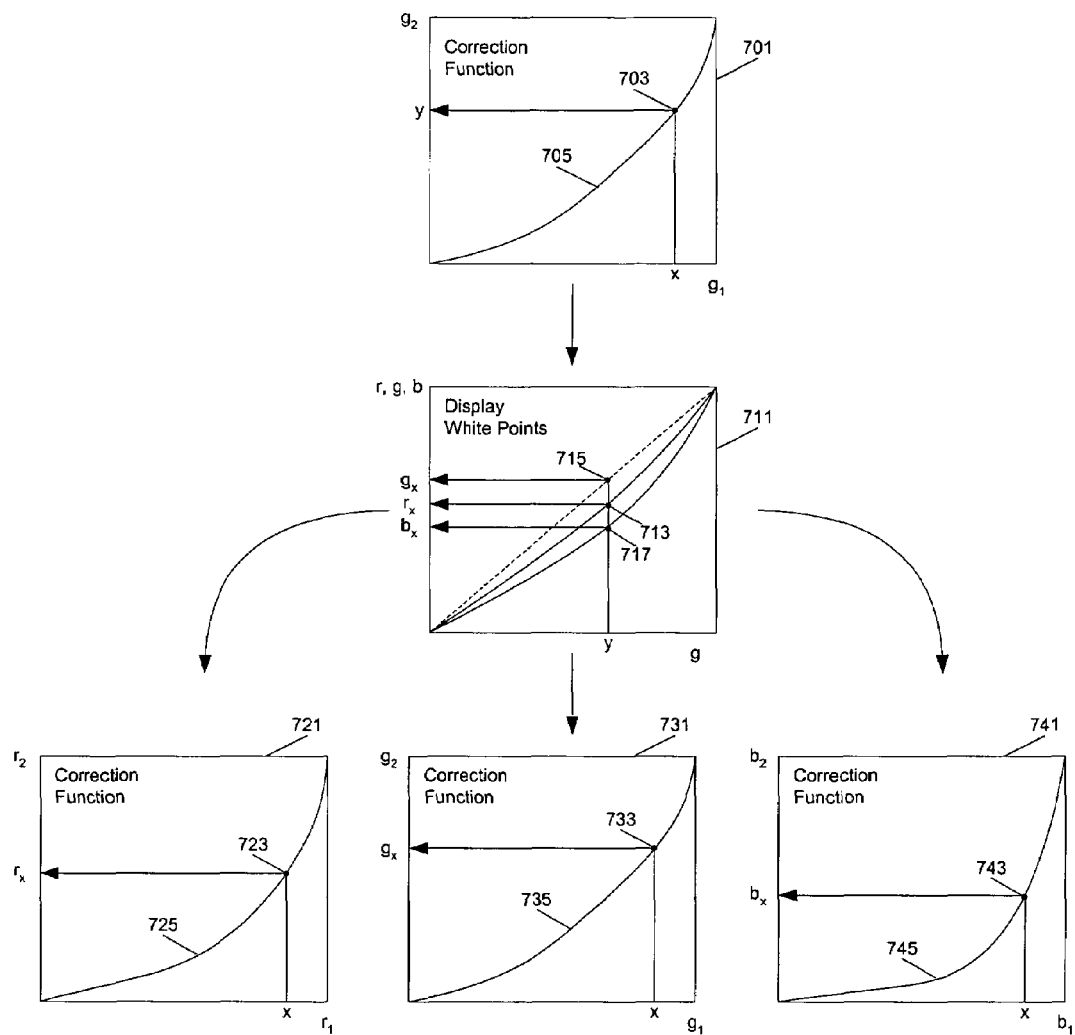
FIG. 7 illustrates a method of generating color correction functions from a color correction function for one color component according to one embodiment of the present invention.

FIG. 7 illustrates a method of generating color correction functions from a color correction function for one color component according to one embodiment of the present invention. Graph 701 shows a correction function for green signal level (e.g., generated according to a traditional method). When the same correction function 705 is also applied to red and blue signals, balanced red, green and blue signals for a gray level will remain balanced. Graph 711 shows the signal levels for producing substantially white point consistent gray levels (e.g., generated using a method as illustrated in, and described with, FIG. 6). Thus, balanced signals can be corrected by curves 713, 715 and 717, to produce white point consistent gray levels. Combining correction function 705 and white point curves 713, 715 and 717 leads to correction functions 725, 735 and 745 for red, green and blue signal levels. For example, point 723 on correction curve 725 for red can be determined from the positions of point 703 on the correction curve 705 for green and point 713 on the white point curve for red. Similarly, points 703 and 717 determine the position of point 743 for the correction function for blue.

Figure 8:
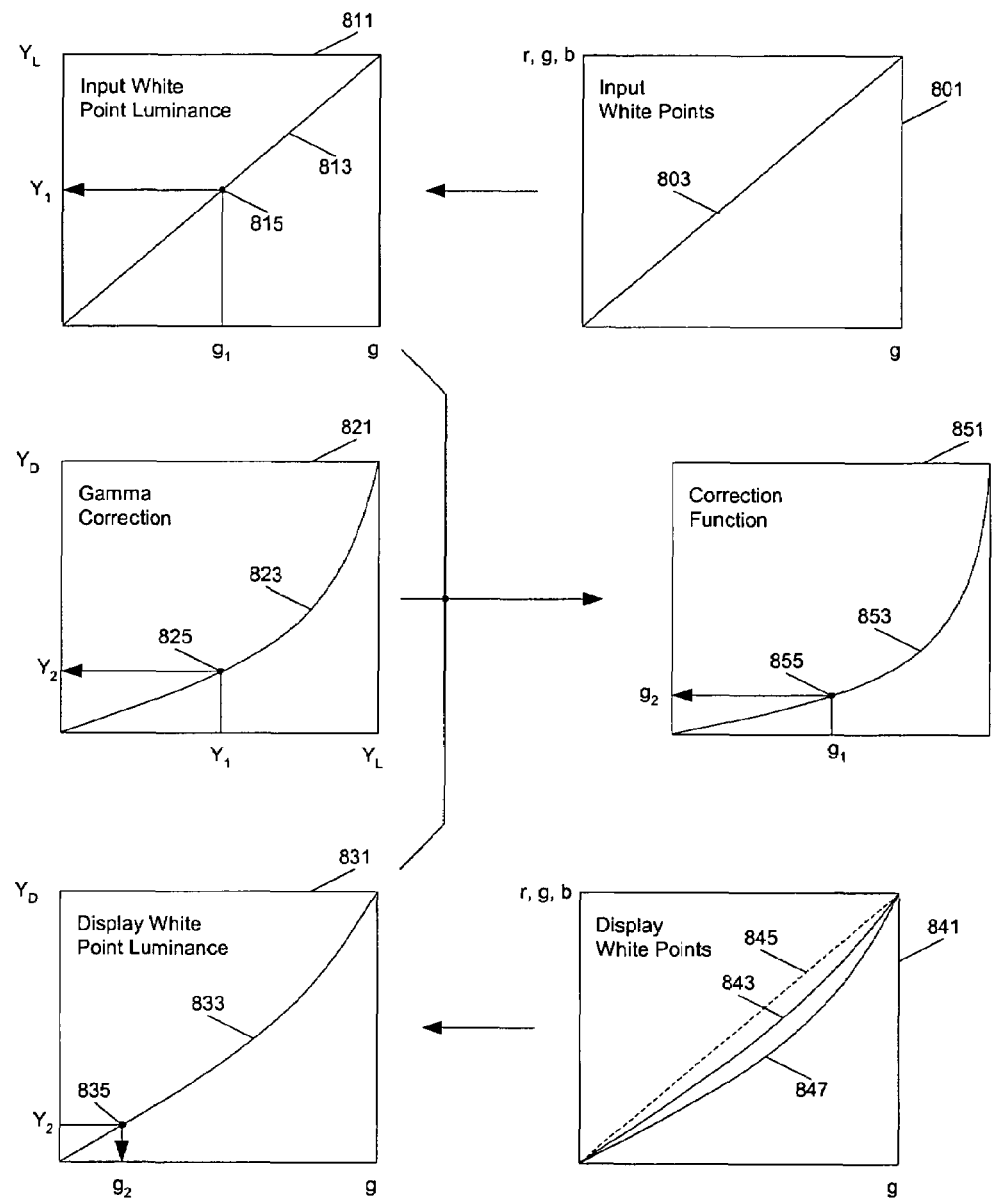
FIG. 8 illustrates a method to generate a color correction function for one color component according to one embodiment of the present invention.

FIG. 8 illustrates a method to generate a color correction function for one color component according to one embodiment of the present invention. In such an embodiment of the present invention, it is desirable to gamma correct the signals such that the luminance of gray levels is corrected to a target gamma. In graph 801, balanced uncorrected signal for gray levels from a white to a black is shown by line 803. Thus, the luminance represented by the uncorrected signals for various gray levels can be determined as shown by line 813 in graph 811. Therefore, an input green signal level $g_1$ for a gray level corresponds to luminance level $Y_1$ at point 815. On the other hand, graph 841 shows the signal levels 843, 845 and 847 for producing white point consistent gray levels on the target display. Thus, the luminance values of the white point consistent gray levels produced on the display can be determined as a function of corrected signal level for green. For example, when the green signal level is $g_2$ for producing a white point consistent gray level, point 835 shows the luminance $Y_2$ of the white point consistent gray level on the device. In order to gamma correct the input luminance $Y_1$ to the target luminance $Y_2$, as shown by point 825 on curve 823 in graph 821, a correction function 853 for the green signal level can be determined. For example, point 855 on curve 853 in graph 851 for input green signal $g_1$ can be determined from: 1) determining $Y_1$ from point 815; 2) determining $Y_2$ from point 825; and 3) determining $g_2$ from point 835. Once the correction function 853 for green is determined, it can be combined with the white point curves in graph 841 to derive the correction functions for the other color components, as illustrated in FIG. 7.

Figure 9:
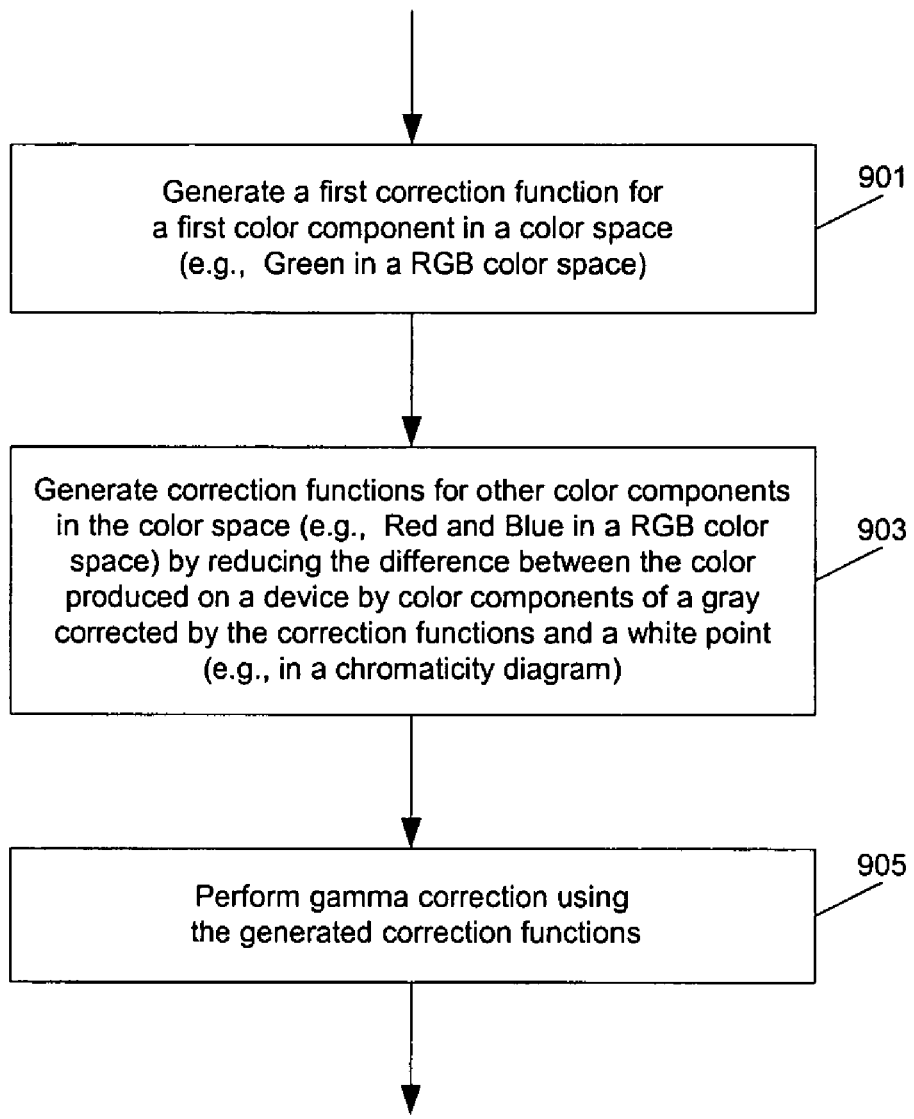
FIG. 9 shows a flow diagram for a method to generate color correction functions for color components in a color space according to one embodiment of the present invention.

FIG. 9 shows a flow diagram for a method to generate color correction functions for color components in a color space according to one embodiment of the present invention. Operation 901 generates a first correction function for a first color component in a color space (e.g., Green in a RGB color space). It can be generated from the native transfer function and the target transfer function for the first color component using a traditional method; or, it can be generated using a method according to the present invention (e.g., a method as illustrated FIG. 8). Typically, luminance property data of the display is used to generate the first correction function. Operation 903 generates correction functions for the other color components in the color space (e.g., Red and Blue in a RGB color space) by reducing the difference between the color produced on a device by color components of a gray corrected by the correction functions and a target white point (e.g., in a chromaticity diagram). Typically, chromaticity property data of the display is used to generate the correction function for the other color components. Operation 905 performs gamma correction using the generated correction functions. By reducing the color difference in operation 905, the generated correction functions ensure the signals representing gray levels produce white point consistent grays on the display once the correction functions are applied.

Figure 10:
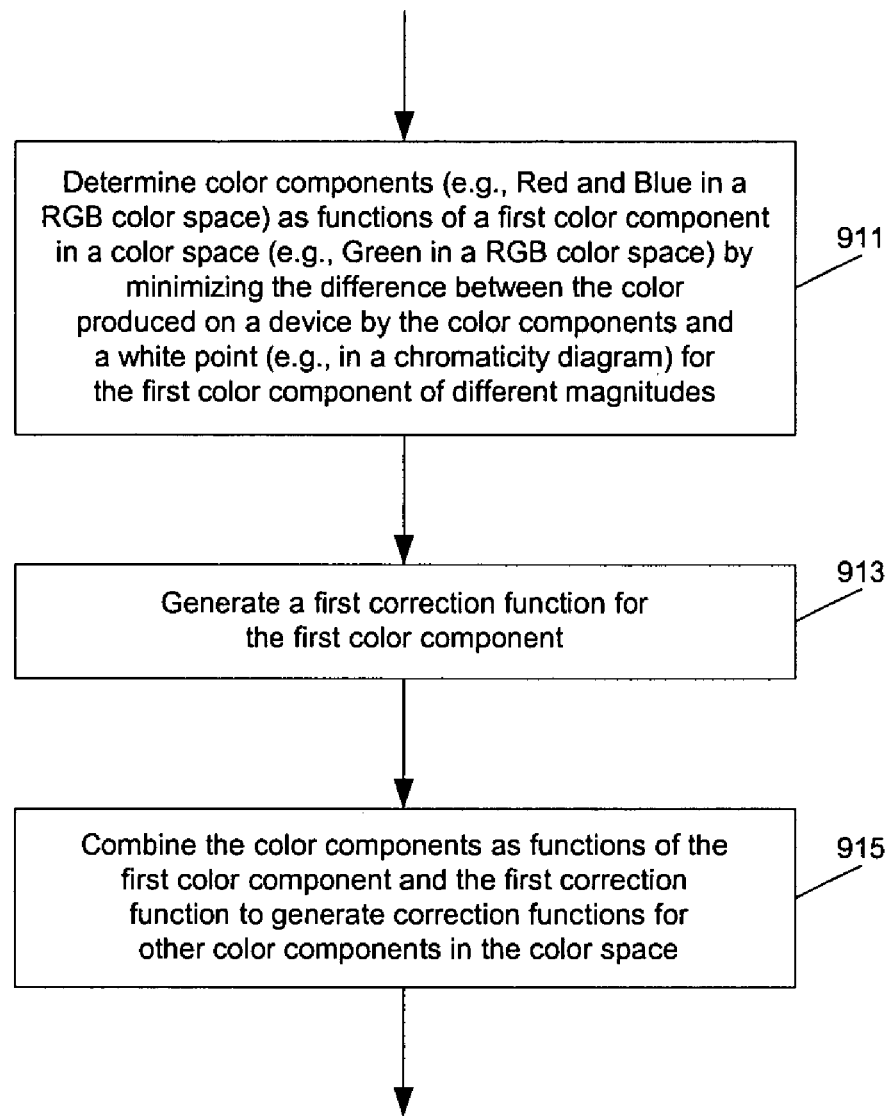
FIG. 10 shows a flow diagram for another method to generate color correction functions for color components in a color space according to one embodiment of the present invention.

FIG. 10 shows a flow diagram for another method to generate color correction functions for color components in a color space according to one embodiment of the present invention. Operation 911 determines the color components (e.g., Red and Blue in a RGB color space) as functions of a first color component in the color space (e.g., Green in a RGB color space) by minimizing the difference between the color produced on a device by the color components and a target white point (e.g., in a chromaticity diagram) for the first color component of different magnitudes. Chromaticity property data of a display device is typically used to generate these white point curves, which specify the other color components in terms of the first color component for producing grays with consistent white points on the device. Operation 913 generates a first correction function for the first color component; and operation 915 combines the color components as functions of the first color component and the first correction function to generate correction functions for other color components in the color space.

Figure 11:
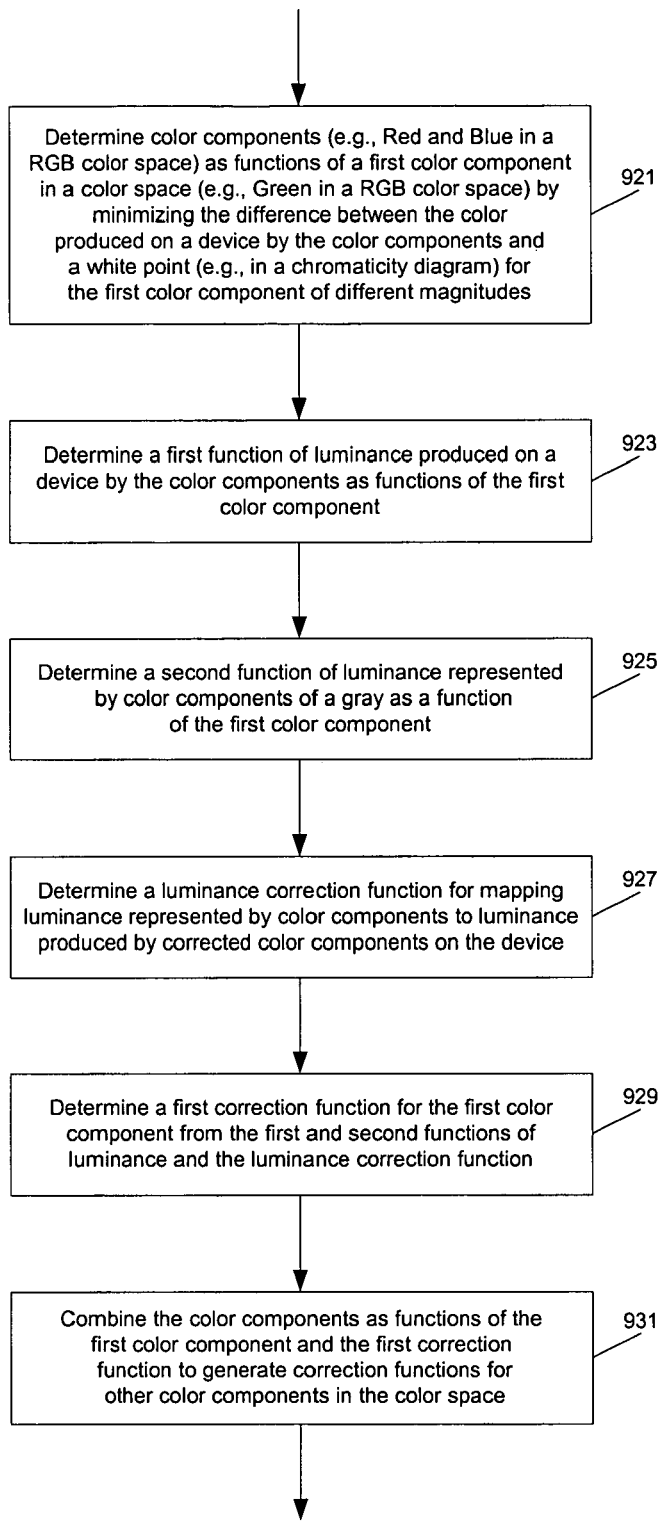
FIG. 11 shows a detailed flow diagram for a method to generate color correction functions for color components in a color space according to one embodiment of the present invention.

FIG. 11 shows a detailed flow diagram for a method to generate color correction functions for color components in a color space according to one embodiment of the present invention. Operation 921 determines color components (e.g., Red and Blue in a RGB color space) as functions of a first color component in a color space (e.g., Green in a RGB color space) by minimizing the difference between the color produced on a device by the color components and a target white point (e.g., in a chromaticity diagram) for the first color component of different magnitudes. After the white point curves are generated from operation 921, operation 923 determines a first function of luminance produced on a device by the color components as functions of the first color component. The first function of luminance represents the luminance of the white point consistent grays on the device as a function of the first color component. Operation 925 determines a second function of luminance represented by color components of a gray as a function of the first color component. The second function of luminance represents the luminance of the input signal as a function of the first color component. Operation 927 determines a luminance correction function for mapping luminance represented by color components to luminance produced by corrected color components on the device. The luminance correction function corrects the input luminance to the target luminance. Operation 929 determines a first correction function for the first color component from the first and second functions of luminance and the luminance correction function; and operation 931 combines the color components as functions of the first color component and the first correction function to generate correction functions for other color components in the color space. Thus, the correction functions generated according to the method in FIG. 11 gamma correct the light intensity of gray levels while maintaining the color of the gray levels substantially consistent with a white point.

Although various examples are illustrated for gamma correction in RGB color space for displaying colors on a display device, it is apparent to one skilled in the art that the methods according the present invention can be applied to color corrections for color components represented in device dependent color spaces for various purpose. When the target device is a color producing device, such as a display or a printer, the color producing properties in luminance and chromaticity can be used to generate gamma correction functions according to the various methods of the present invention. When the target device is a color sensing device, such as a scanner or a video camera, the color sensing properties in luminance and chromaticity can be used to generate gamma correction functions according to the various methods of the present invention. Although various illustrated examples use correction functions to generate white point consistent gray levels, it would be apparent to one skilled in the art that the correction functions can be generated to maintain a substantially consistent color point (e.g., a color point as defined in a chromaticity diagram in the xy color space, which is a subspace of the xyY color space) over a plurality of colors.

Following is the source code for a method to compute the look-up tables that balance the R and B components of a color signal in a RGB color space for a target white point (e.g., $D_{65}$). A simple (Euclidean) color distance is used in minimizing the color differences between the target white point ($D_{65}$) and the colors corrected by the look-up tables.

```
// structure to hold the chromaticity and the luminance value
typedef struct {
    float   fx;    // x CIE chromaticity value
    float   fy;    // y CIE chromaticity value
```

```
        float   fY;  // Y Luminance value
} CIEColor;
/*_____*/
// This function computes the additive mixture of 2 colors
void
AdditiveMix (
    float x1 float y1, float Y1,     // input 1, chromatic & luminance info
    float x2, float y2, float Y2,    // input 2, chromatic & luminance info
    float *xc, float *yc, float *Yc  // output, chromatic & luminance info
    )
{
    fa = (Y2/y2)/(Y1/y1 + Y2/y2);
    *xc = x1 + (x2 − x1) * fa;
    *yc = y1 + (y2 − y1) * fa;
    *Yc = Y1 + Y2;
}
/*_____*/
// This function computes the look-up tables that balance the R and B for
// the target white point, in this case, D65.
void
LUTCorrection(
    int        niSamples,   // number of samples per channel
    CIEColor   *R,          // Red response, chromatic and luminance info
    CIEColor   *G,          // Green response, chromatic and luminance info
    CIEColor   *B,          // Blue response, chromatic and luminance info
    CIEColor   *W,          // Gray response, chromatic and luminance info
    int        *rLUT,       // output R look-up tables
    int        *gLUT,       // output G look-up tables
    int        *bLUT        // output B look-up tables
    )
{
    int    i, j, k,im,jm, ;
    float  fx, fy, fY, fx1, fy1, fY1, fD, fDm, fDx, fDy,
           fxw = 0.3127, fyw = 0.3290;   // target white point, i.e. D65
    for(k=0; k< niSamples; k++) {
        im = 0; jm = 0;
        fDm = 2; // initial value > max distance = (1^2+1^2)^.5
        for(j=0; j< niSamples; j++) {
            for(i=0; i< niSamples; i++) {
                AdditiveMix(   R[i].fx, R[i].fy, R[i].fY,
                               B[j].fx, B[j].fy, B[j].fY,
                               &fx1, &fy1, &fY1 );
                AdditiveMix(   G[k].fx, G[k].fy, G[k].fY,
                               fx1, fy1, fY1,
                               &fx, &fy, &fY );
                // a simple (Euclidean) color distance is used here
                fDx = fx − fxw; fDy = fy − fyw;
                fD = pow( (fDx*fDx + fDy*fDy), .5);
                if( fD < fDm ) { // retain the case of minimum error
                    fDm = fD; im = i; jm = j;
                }
            }
        }
        i = im; j = jm;
        rLUT [k] = im * 255./(niSamples−1.);    // Red look-up table
        gLUT [k] = k * 255./(niSamples−1.);     // Green look-up table
        bLUT [k] = jm * 255./(niSamples−1.);    // Blue look-up table
    }
}
/*_____*/
```

When color correction functions are derived for a display device (e.g., an LCD splay panel) to have a consistent white point for grays, the display device can display the gray scale colors correctly. However, because of the asymmetry of the transfer functions and the distortion of the primary colors at different levels of driving signals (e.g., as illustrated by curves 441, 443 and 445 in FIG. 4), the display device may not display other colors optimally according to the preference of a typical observer. For example, the skin tone colors may look desaturated while the observer may prefer a boost of the skin color toward a more vivid skin color. The rendering of the skin tone may be adjusted by modifying the RGB channel balance, which if it is done globally for the entire color space, can induce an apparent pinkish color shift in grays. But because in the color space the skin colors region and the light gray color region are relatively separate regions, they may be corrected through separate corrections for optimal color rendering of each color space region.

At least one embodiment of the present invention seeks to correct the color on the displays (e.g., by setting the native display information for a device to pseudo-native display information obtained according to embodiments of the present invention) such that optimal gamma corrections are achieved for photographic reproduction as well as for the user interface elements (e.g., on an LCD display panel).

It is discovered that: i) white point consistency of gray scales in high luminance regions are important for a good appearance of user interface elements in different shades of grays; and ii) skin tone colors that are important for photographic reproduction are not in the same high luminance regions. Thus, at least one embodiment of the present invention seeks to derive color correction functions to optimize the grays in one region (e.g., a high luminance region) and optimize the skin tone colors in another region. Thus, optimum color rendering for skin tone colors is achieved while maintaining white point balance of the gray colors of the user interface elements. In one embodiment of the present invention, the color correction is encapsulated in a color profile (e.g., as pseudo-native device properties, such as pseudo-native display transfer functions) such that a single unique system function (e.g., ColorSync API function) can be used to create a customized look up table (LUT) for color correction (including gamma correction) using a video card or other display or printer driver. More details are described below.

Figure 12:
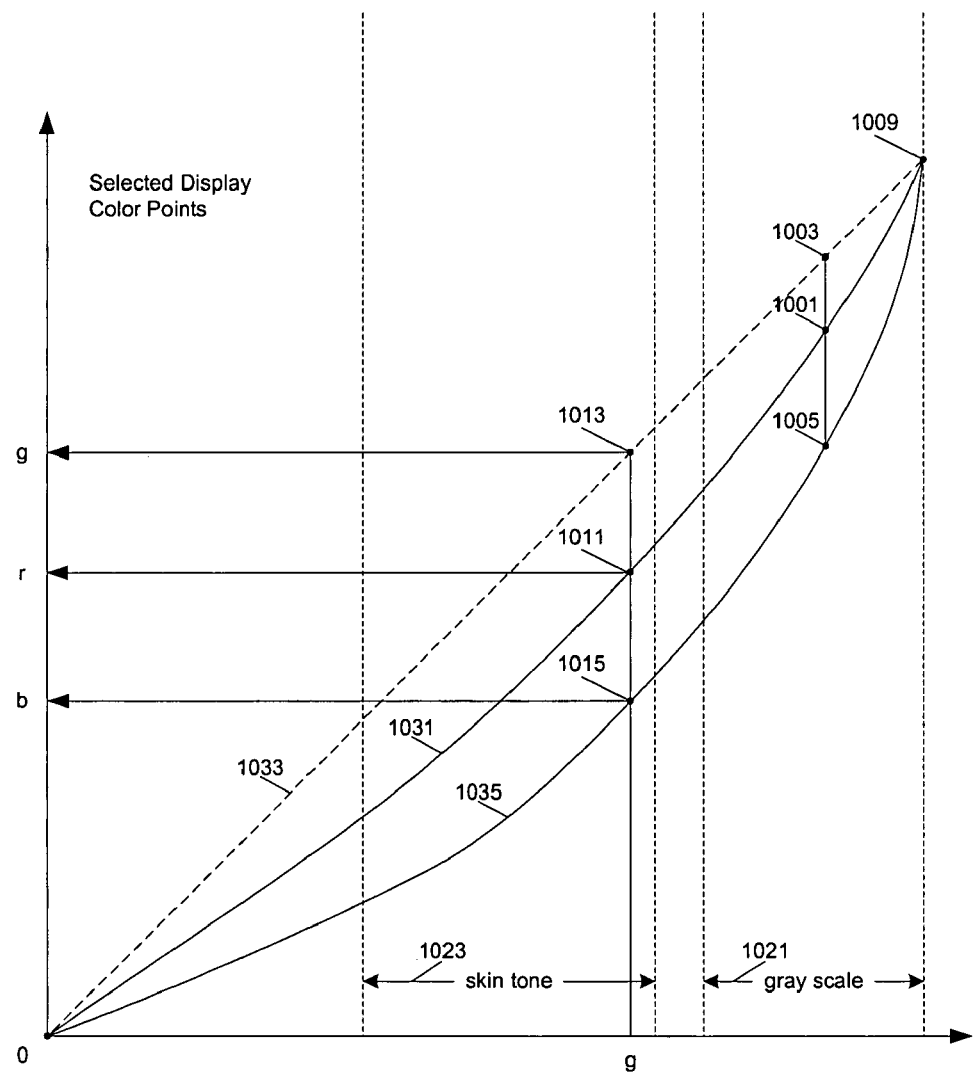
FIG. 12 illustrates a method of generating color components that generate colors on a device, which colors are close to a number of selected color points according to one embodiment of the present invention.

FIG. 12 illustrates a method of generating color components that generate colors on a device, which colors are close to a number of selected color points according to one embodiment of the present invention. In FIG. 12, at each level of the green (g) component, curves 1031 and 1035 show the corresponding red (r) and blue (b) components for producing on the device (e.g., an LCD display panel) a color at (or near) a desirable color point in a chromaticity diagram (e.g., the diagram shown in FIG. 4). The curves in FIG. 12 can be derived from the native transfer functions (or other information about the device, such as curves 441, 443 and 445 in FIG. 4). Different regions of the curves in FIG. 12 are determined for different color points (or different shades of colors). For example, in a high luminance region (e.g., region 1021), the selected colors correspond to a consistent white point in the chromaticity diagram that will correspond to the rendition of gray colors of the user interface elements. For example, when the LCD panel is driven by the uncorrected color signal with: 1) red component at point 1001, 2) green component at point 1003, and 3) blue component at point 1005, the display panel shows a gray color with the consistent white point in the chromaticity diagram. However, instead of optimizing for grays, region 1023 is used for optimizing skin tone colors. Because the user interface gray colors are not rendered with the tones in the region 1023, the color correction in this region is optimized for skin color rendering. For example, when the LCD panel is driven by the uncorrected color signal with: 1) red component at point 1011, 2) green component at point 1013, and 3) blue component at point 1015, the display panel shows a skin tone color with a corresponding color point in the chromaticity diagram. In region 1023, the colors produced by the display may correspond to a single color point in the chromaticity diagram, or a number of disconnected color points in the chromaticity diagram, or one or more curves in the chromaticity diagram. The colors selected for regions 1023 are considered important for the skin tone rendering in photographic reproduction (or for other applications, or user preferences). Thus, the curves in FIG. 12 show the levels of color components which, when driving the display device, cause the display device to produce the desirable color shades. The desirable color shades may be grays (e.g., in region 1021) and skin tone colors (e.g., in region 1023). However, other types of optimization for different regions may also be used. In one embodiment of the present invention, the region in which the green (g) component is larger than 238 (in the range of 0 to 255) is selected for the optimization of grays; and, a region in which the green (g) component is smaller than 238 is selected for the optimization of skin tone colors. In general, the signal curves in FIG. 12 may be chosen so that the colors produced on the device by the input signals correspond to a number of selected discrete points in the chromaticity diagram, or a number of curve segments in the chromaticity diagram, or one continuous curve in the chromaticity diagram. The curves may be determined from the selection of the points (and/or curves) in the chromaticity diagram and the native transfer functions of the display panel. Alternatively, the colors may be determined from a graphical user interface. For example, the graphical user interface may display a set of colors on the display device, which can be compared to a reference (e.g., a reference card with pre-printed color shades, a pre-calibrated display, or a measuring instrument). Through the user interface, the input curves can be adjusted until the display result matches the reference (or the preference of an observer).

Since the curves in FIG. 12 relate the color components (e.g., R, G and B) at different levels for the reproduction of desirable color shades (e.g., grays in region 1021 and skin tone colors in region 1023), the color correction function (e.g., for gamma) for one color component (e.g., G) can be used to derived the corresponding color correction functions for the other color components (e.g., R and B). Thus, the color correction functions for gamma correction are not separately derived from the native transfer functions but independently from each other.

Figure 13:
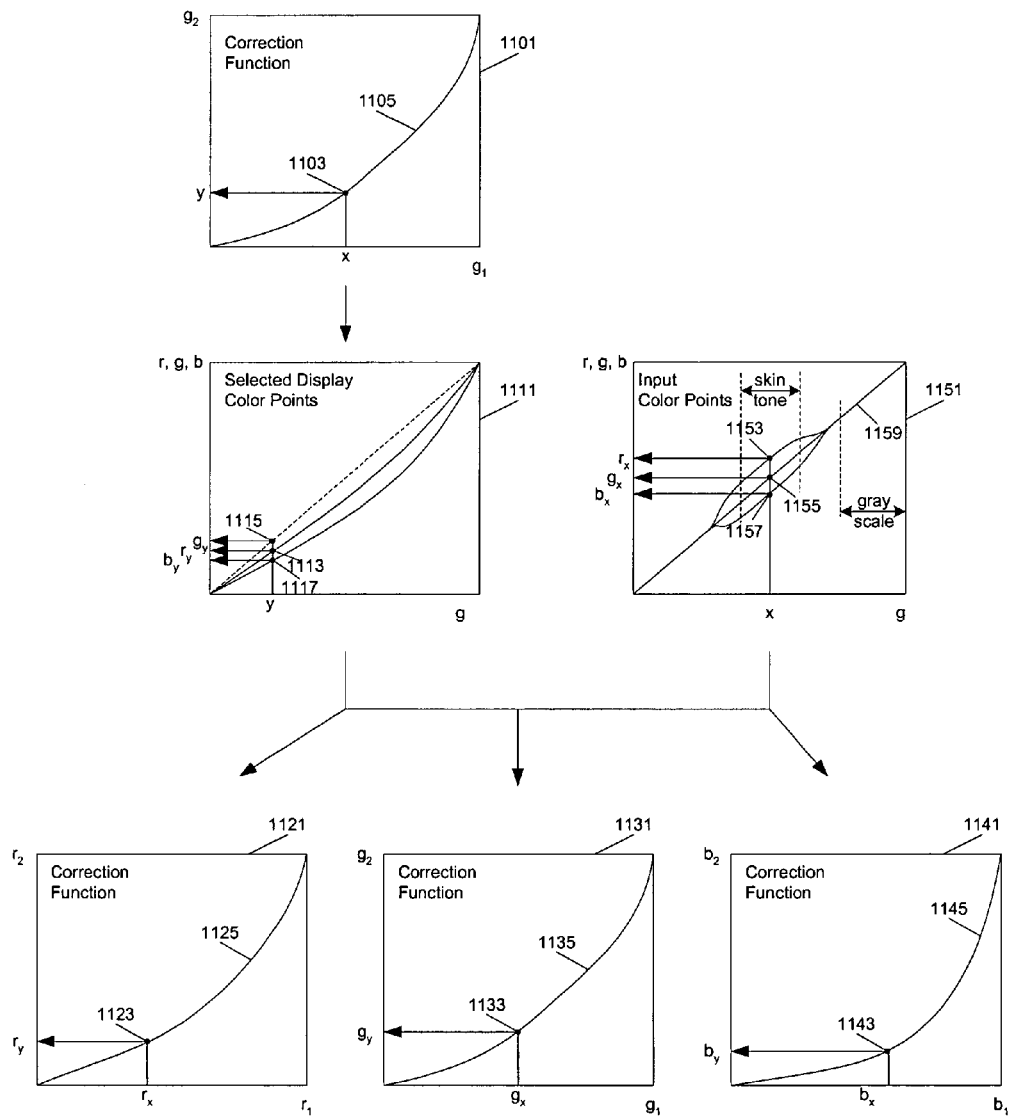
FIG. 13 illustrates a method of generating color correction functions to optimize gray scale colors and skin tone colors according to one embodiment of the present invention.

FIG. 13 illustrates a method of generating color correction functions to optimize gray scale colors and skin tone colors according to one embodiment of the present invention. Graph 1101 shows a correction function for the green component (e.g., generated according to a traditional method). Graph 1111 shows the signal levels for producing selected colors (e.g., generated using a method as illustrated in, and described with, FIG. 12). Graph 1151 shows the input signal levels that correspond to the selected colors before the correction (e.g., that causes a perfect device to display the same selected colors, or that defines the same selected colors on the same chromaticity diagram). For example, in the region optimized for grays, the red, green and blue values are balanced (see segment 1159) differently from the region optimized for skin tone, the red, green and blue values (e.g., red component (see curve 1153) is higher than the green component (see curve 1155); and the blue component (see curve 1157) is lower than the green component (see curve 1155)). Combining correction function 1105, display color point curves 1113, 1115 and 1117, and input color curves in graph 1151 leads to correction functions 1125, 1135 and 1145 for red, green and blue signal levels. For example, point 1103 on correction function 1105 shows the green values before and after the correction (e.g., x and y); points 1153, 1155 and 1157 show the input values ($r_x$, $g_x$, $b_x$) before the correction if the skin tone color is to be produced when the green component is x; points 1113, 1115 and 1117 show the input values ($r_y$, $g_y$, $b_y$) after the correction if the skin tone color is to be produced when the green component is y; thus, point 1123 on correction curve 1125 for red can be determined from the position of point 1103 on the correction curve 1105 for green, the position of point 1113 of the display color point curve for red and the position of point 1153 of the input color point curve for red. Similarly, the position of point 1143 for the correction function for blue is determined from the positions of points 1103, 1117 and 1157. Different points on curve 1105 generate different points on curves 1125 and 1145. In FIG. 13, it is seen that curve 1135 is the same as curve 1105, since the green component is used as the reference variable to define the curves in graphs 1111 and 1151.

Figure 14:
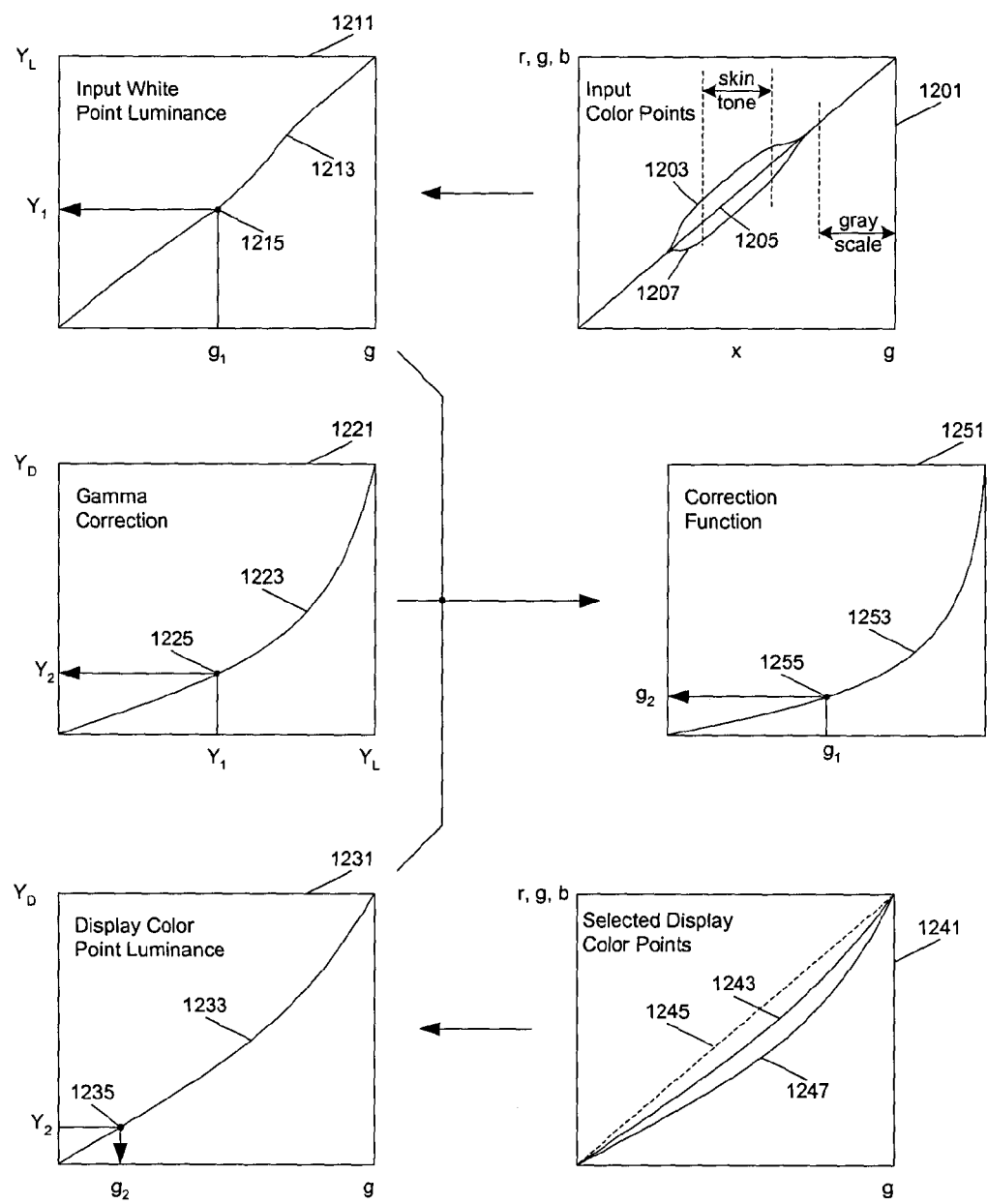
FIG. 14 illustrates a method to generate a color correction function for one color component to optimize gray scale colors and skin tone colors according to one embodiment of the present invention.

FIG. 14 illustrates a method to generate a color correction function for one color component to optimize gray scale colors and skin tone colors according to one embodiment of the present invention. In such an embodiment of the present invention, it is desirable to gamma correct the signals such that the luminance of the selected colors are corrected to a target gamma. In FIG. 14, uncorrected signals of the selected colors are shown in graph 1201. For example, the balanced red, green and blue components define the grays in the high green component region; and, the unbalanced red, green and blue components (e.g., curves 1203, 1205 and 1207) define the colors for the optimization of skin tone. Thus, the luminance represented by the uncorrected signals for various color shades are determined, as shown by curve 1213 in graph 1211. For example, an input green signal level $g_1$ for a color shade (e.g., a skin tone color) corresponds to luminance level $Y_1$ at point 1215. On the other hand, graph 1241 shows the signal levels 1243, 1245 and 1247 for producing the selected color points on the target display, which characterizes the native display properties of the target display. Similarly, the luminance values of the selected colors produced on the display are determined as a function of corrected signal level for green. For example, when the green signal level is $g_2$ for producing a target color, point 1235 shows the luminance $Y_2$ on the device. In order to gamma correct the input luminance $Y_1$ to the target luminance $Y_2$, as shown by point 1225 on curve 1223 in graph 1221, a correction function 1253 for the green signal level can be determined. For example, point 1255 on curve 1253 in graph 1251 for input green signal $g_1$ can be determined from: 1) determining $Y_1$ from point 1215; 2) determining $Y_2$ from point 1225; and 3) determining $g_2$ from point 1235. Once the correction function 1253 for green is determined, it can be used to derive the correction functions for the other color components, as illustrated in FIG. 13.

In one embodiment of the present invention, a graphical user interface is used to display the colors that are to be calibrated (e.g., the grays and skin tone colors). A set of gamma correction functions (e.g., those derived using a traditional method or a method according to one embodiment of the present invention, or a set of reference gamma correction functions) may be optionally used to perform the gamma correction. In a range of parameter (e.g., luminance or G), the color components are adjusted interdependently (e.g., through the graphical user interface), before the set of gamma correction function are applied if the set of gamma correction functions are used, so that the colors appear on the display device are properly calibrated (e.g., according to a reference color card, according to a reference display device, according to a measuring instrument, or according to the preference of an human observer). The calibration may be performed according to visual inspection or with the help of a measuring instrument. The color corrections for the components can then be determined from the amounts of adjustments applied (which may be combined with the set of gamma correction functions when used).

In one embodiment of the present invention, one algorithm is used to derive the correction functions (e.g., look up tables for gamma correction) from a set of native property definitions for the color device (e.g., native transfer functions). For example, when a set of native property definitions is provided for a color display, the operating system can compute the look up tables for gamma correction and load the look up tables into the video card of the computer. To allow the single algorithm to be used for different color correction options (e.g., for a white point consistent only color correction, or for white point consistent in one region and skin tone optimization in another region), the different color corrections are determined from the native property definitions using different algorithms (e.g., methods according to embodiments of the present invention) and then applied to the native property definitions to generate pseudo-native property definitions, such that when the single algorithm is applied on the pseudo-native property definitions, the desired color correction functions are obtained. For example, a single algorithm may use a traditional method to individually derived the correction functions for the red, green and blue channels for a target gamma from the native transfer functions (e.g., using the method as illustrated in FIG. 2); the single algorithm can be reversed to determine the pseudo-native transfer functions from the correction functions; thus, after the new correction functions for red, green and blue channels are determined (e.g., according to embodiments of the present invention, such as the method as illustrated in FIG. 3 for a consistent white point, or the method as illustrated in FIG. 13 for optimizing both grays and skin tone colors), pseudo-native transfer functions are calculated from the new correction functions such that, when the traditional method is applied on the pseudo-native transfer functions, the traditional method returns the same new correction functions (e.g., that have a consistent white point or that are optimized for both the grays for user interface elements and skin tone colors for photographs). Thus, when the pseudo-native transfer functions are used, the single algorithm (e.g., the traditional algorithm for generating gamma corrections separately for each of the color components) can be used to provide look up tables for the color corrections of various different types (e.g., for a consistent white point, or for optimizing both grays for user interface elements and skin tone colors for photographs or videos). Thus, the pseudo-native transfer functions can be used to upgrade the old systems that use the single algorithm (e.g., the traditional method) in generating the look up tables such that the old systems can produce better colors (e.g., according to embodiments of the present invention to have a consistent white point or optimum display of grays and skin tone colors) without having to update hardware or software (other than the pseudo-native transfer functions for the color device).

Further, a number of sets of the pseudo-native transfer functions may be combined (e.g., through a weighted average process) to obtain a set of pseudo-native transfer functions to provide trade-offs among different types of preferences (e.g., white point consistency, skin tone rendering, grays, and others). For example, a weighted average of sets of the pseudo-native transfer functions may be used to generate a set of pseudo-native transfer functions. In another example, the color correction functions are normalized (e.g., with respect to a reference gamma, or the color correction functions derived from a traditional method or a method of the present invention) as normalized color correction functions; and, a weighted average of the normalized color correction functions is then used to generate the new color correction functions and pseudo-native transfer functions. From this description, it will be apparent to one skilled in the art that many variations of the methods for obtaining pseudo-native transfer functions and for combining color correction functions (and thus, the pseudo-native transfer functions) for weighted trade-offs (e.g., for different preferences) can be envisioned.

Figure 15:
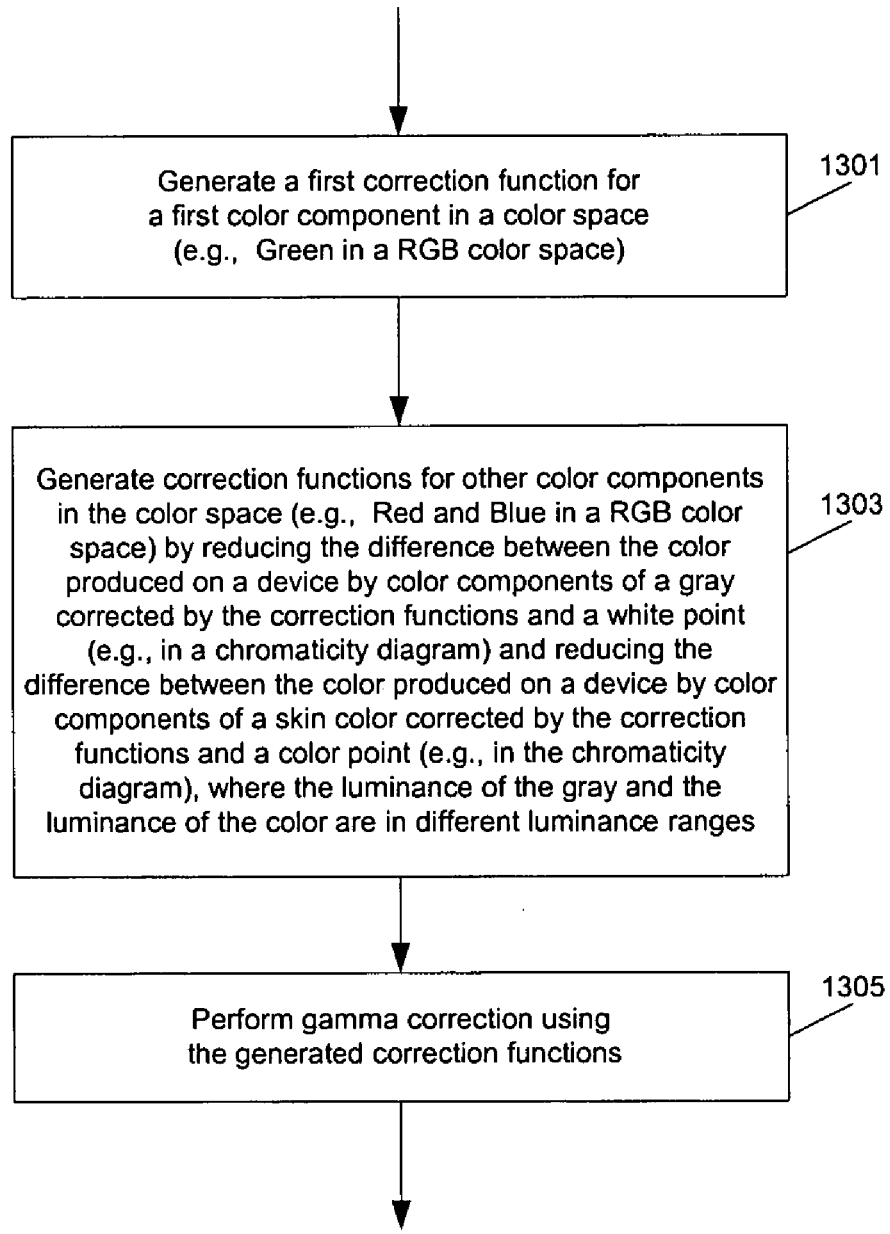
FIG. 15 shows a flow diagram for a method to generate color correction functions to minimize the distortion relative to a plurality of color points according to one embodiment of the present invention.

FIG. 15 shows a flow diagram for a method to generate color correction functions to minimize the distortion relative to a plurality of color points according to one embodiment of the present invention. Operation 1301 generates a first correction function for a first color component in a color space (e.g., Green in a RGB color space). It can be generated from the native transfer function and the target transfer function for the first color component using a traditional method; or, it can be generated using a method according to the present invention (e.g., a method as illustrated FIG. 14 or FIG. 8). Typically, luminance property data of the display is used to generate the first correction function. Operation 1303 generates correction functions for other color components in the color space (e.g., Red and Blue in a RGB color space) by reducing the difference between the color produced on a device by color components of a gray corrected by the correction functions and a white point (e.g., in a chromaticity diagram) and reducing the difference between the color produced on a device by color components of a skin color corrected by the correction functions and a color point (e.g., in the chromaticity diagram), where the luminance of the gray and the luminance of the color are in different luminance ranges. Chromaticity property data of the display may be used to generate the correction function for the other color components. Operation 1305 performs gamma correction using the generated correction functions. Thus, in one embodiment, once the correction functions are applied, the signals representing gray levels produce on the device white point consistent grays for graphical user interface elements; and, the signals representing skin tone colors produce on the device colors good for photograph reproduction. In one embodiment of the present invention, the color correction functions are generated in the form of gamma look up tables for video cards. Thus, the color correction according to embodiments of the present invention can be used with any video cards known in the art that use gamma look up tables for gamma correction without modification to the hardware, once the gamma look up tables according to embodiments of the present invention are loaded into the video cards.

Figure 16:
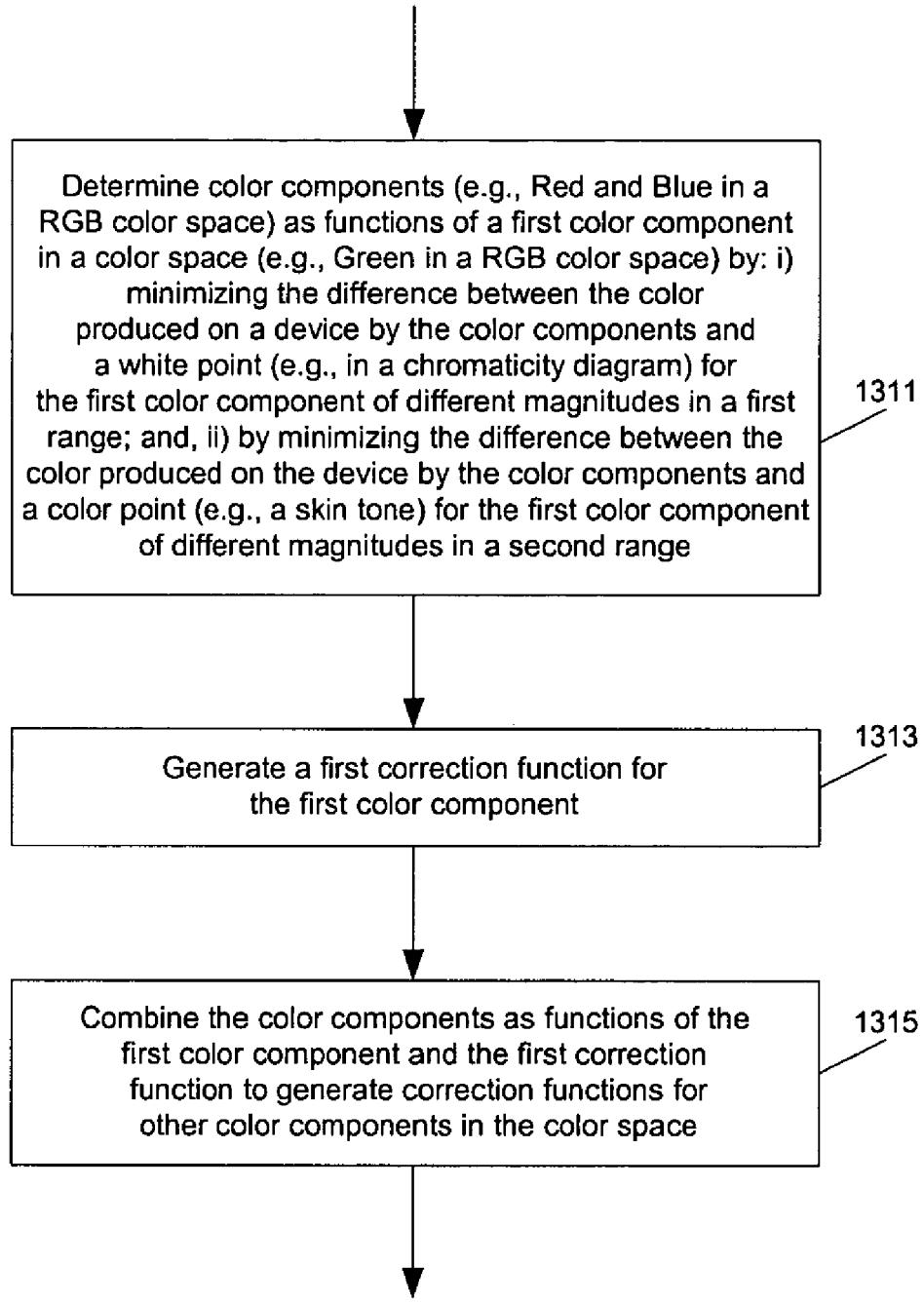
FIG. 16 shows a flow diagram for another method to generate color correction functions for color components in a color space to minimize the distortion of different color tones in different ranges of a color component according to one embodiment of the present invention.

FIG. 16 shows a flow diagram for another method to generate color correction functions for color components in a color space to minimize the distortion of different color tones in different ranges of a color component according to one embodiment of the present invention. Operation 1311 determines color components (e.g., Red and Blue in a RGB color space) as functions of a first color component in a color space (e.g., Green in a RGB color space) by: i) minimizing the difference between the color produced on a device by the color components and a white point (e.g., in a chromaticity diagram) for the first color component of different magnitudes in a first range; and, ii) by minimizing the difference between the color produced on the device by the color components and a color point (e.g., a skin tone) for the first color component of different magnitudes in a second range. Chromaticity property data of a display device may be used to generate these device color point curves, which specify the other color components in terms of the first color component for producing selected colors (e.g., corresponding to a white point and skin tone color points) on the device. Alternatively, the color components as functions of the first color component can be generated through displaying (e.g., using a graphical user interface) the colors for the white point (e.g., grays) and the colors for the color point (e.g., skin tone colors) for inspection and through adjusting (e.g., through the graphical user interface) the color components interdependently. Operation 1313 generates a first correction function for the first color component; and operation 1315 combines the color components as functions of the first color component and the first correction function to generate correction functions for other color components in the color space.

Figure 17:
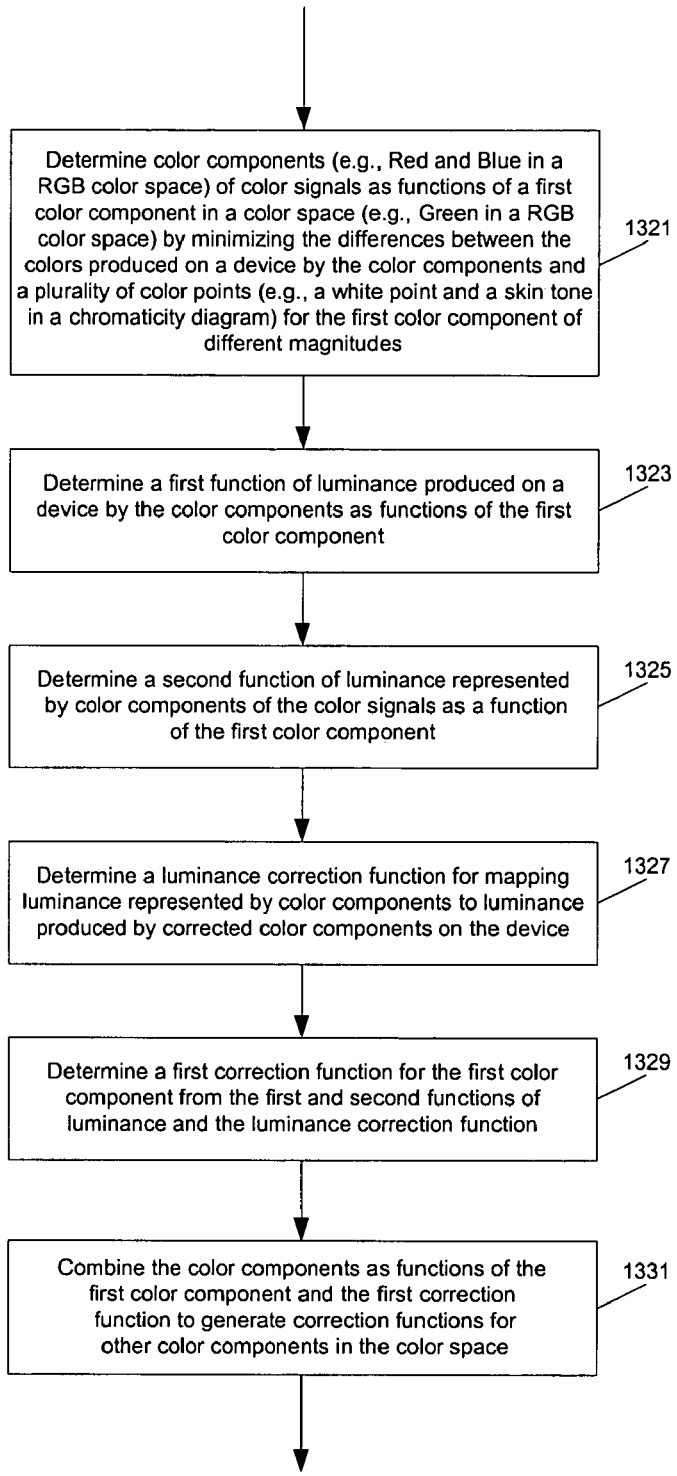
FIG. 17 shows a detailed flow diagram for a method to generate color correction functions for color components in a color space to minimize the distortion of different color in different ranges of a color parameter according to one embodiment of the present invention.

FIG. 17 shows a detailed flow diagram for a method to generate color correction functions for color components in a color space to minimize the distortion of different color in different ranges of a color parameter according to one embodiment of the present invention. Operation 1321 determines color components (e.g., Red and Blue in a RGB color space) of color signals as functions of a first color component in a color space (e.g., Green in a RGB color space) by minimizing the differences between the colors produced on a device by the color components and a plurality of color points (e.g., a white point and a skin tone in a chromaticity diagram) for the first color component of different magnitudes. After the device color point curves are generated from operation 1321, operation 1323 determines a first function of luminance produced on a device by the color components as functions of the first color component. The first function of luminance represents the luminance of the selected colors on the device as a function of the first color component. Operation 1325 determines a second function of luminance represented by color components of the color signals as a function of the first color component. The second function of luminance represents the luminance of the input signal as a function of the first color component. Operation 1327 determines a luminance correction function for mapping luminance represented by color components to luminance produced by corrected color components on the device. The luminance correction function corrects the input luminance to the target luminance. Operation 1329 determines a first correction function for the first color component from the first and second functions of luminance and the luminance correction function; and operation 1331 combines the color components as functions of the first color component and the first correction function to generate correction functions for other color components in the color space. Thus, the correction functions generated according to the method in FIG. 17 gamma correct the light intensity of color shades while maintaining the proper chromaticity for the color shades (e.g., grays and skin tone colors).

Figure 18:
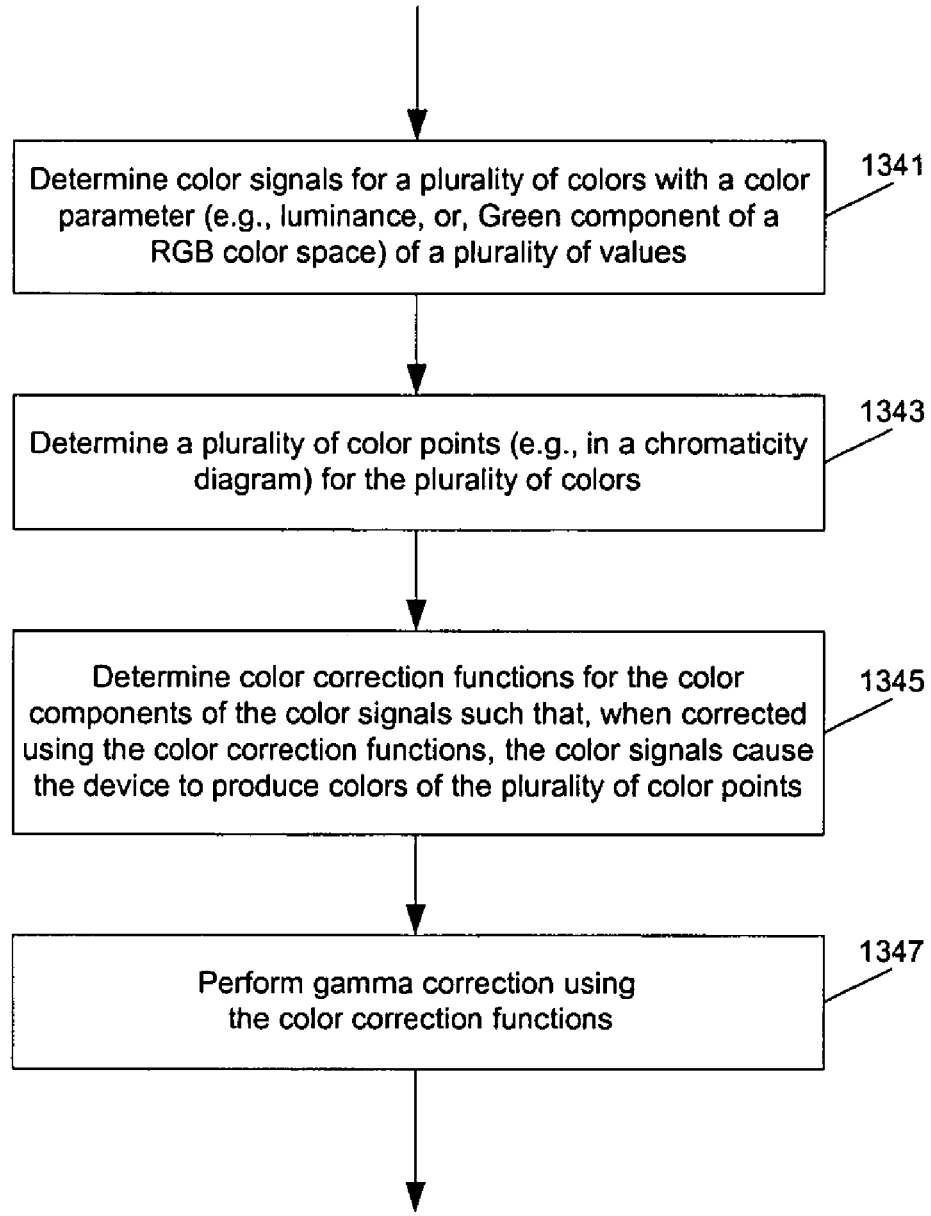
FIG. 18 shows another method to generate color correction functions according to one embodiment of the present invention.

FIG. 18 shows another method to generate color correction functions according to one embodiment of the present invention. Operation 1341 determines color signals for a plurality of colors with a color parameter (e.g., luminance, or, Green component of a RGB color space) of a plurality of values. For example, the appearance of the colors produced on a display device by the color signals can be inspected (e.g., visually by an inspector, or by an instrument) and adjusted through adjusting the color signals interdependently so that the plurality of colors on the display device are well calibrated. Operation 1343 determines a plurality of color points (e.g., in a chromaticity diagram) for the plurality of colors. The color points determine the uncorrected color signals for the plurality of colors. Operation 1345 determines color correction functions for the color components of the color signals such that, when corrected using the color correction functions, the color signals cause the device to produce colors of the plurality of color points. Operation 1347 performs gamma correction using the color correction functions.

Figure 19:
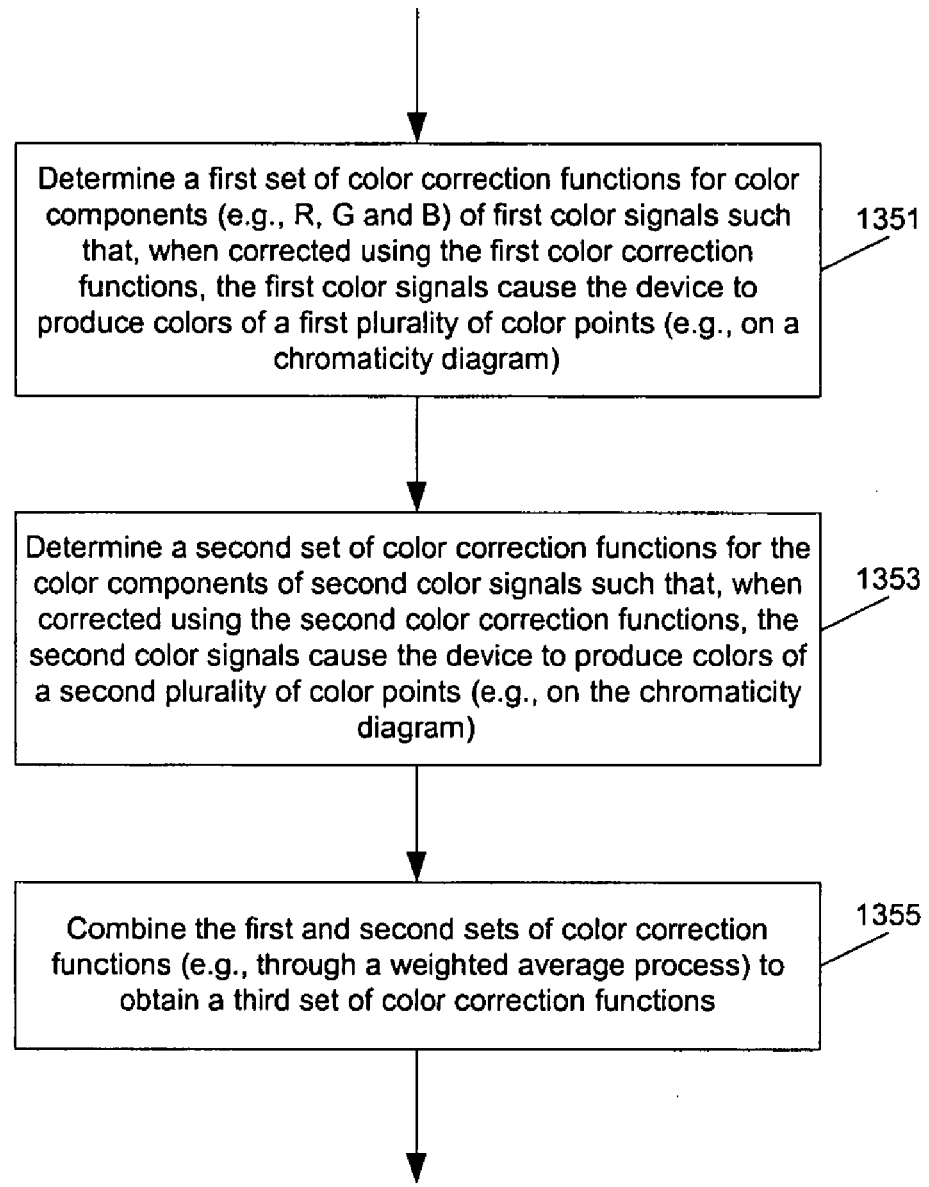
FIG. 19 shows a method to combine color correction functions optimized for different color points to generate color correction functions according to one embodiment of the present invention.

FIG. 19 shows a method to combine color correction functions optimized for different color points to generate color correction functions according to one embodiment of the present invention. Operation 1351 determines a first set of color correction functions for color components (e.g., R, G and B) of first color signals such that, when corrected using the first color correction functions, the first color signals cause the device to produce colors of a first plurality of color points (e.g., on a chromaticity diagram). Operation 1353 determines a second set of color correction functions for the color components of second color signals such that, when corrected using the second color correction functions, the second color signals cause the device to produce colors of a second plurality of color points (e.g., on the chromaticity diagram). Operation 1355 combines the first and second sets of color correction functions (e.g., through a weighted average process) to obtain a third set of color correction functions. The combination may be performed through a direct weighted average of the correction functions, or through a weighted average of pseudo-native transfer functions, or through a weighted average of normalized correction functions, or others, as discussed above.

Figure 20:
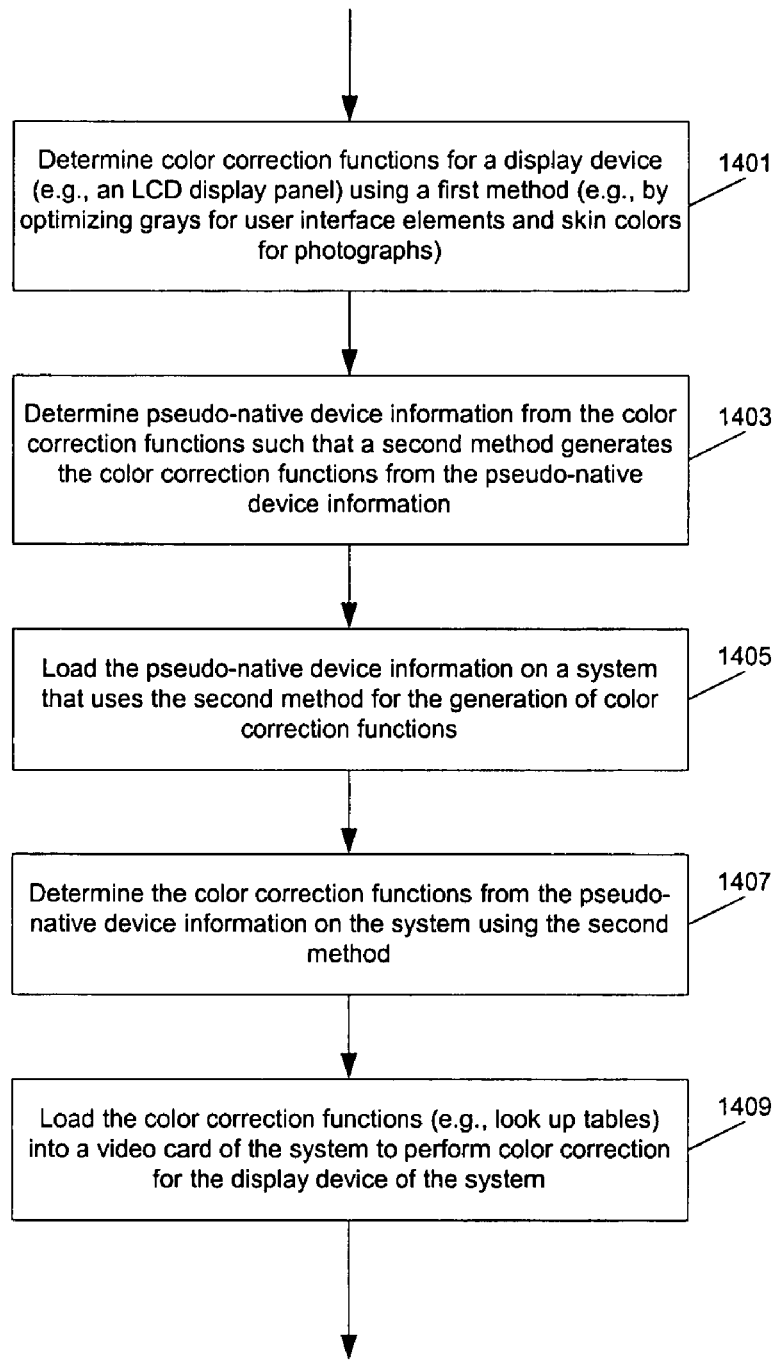
FIG. 20 shows a method to use pseudo-native device information for color correction according to one embodiment of the present invention.

FIG. 20 shows a method to use pseudo-native device information for color correction according to one embodiment of the present invention. Operation 1401 determines color correction functions for a display device (e.g., an LCD display panel) using a first method (e.g., by optimizing grays for user interface elements and skin colors for photographs). Operation 1403 determines pseudo-native device information from the color correction functions such that a second method generates the color correction functions from the pseudo-native device information. Operation 1405 loads the pseudo-native device information on a system that uses the second method for the generation of color correction functions. The pseudo-native device information may be supplied to an existing system as an update for the color profile for the display device. After operation 1407 determines the color correction functions from the pseudo-native device information on the system using the second method, operation 1409 loads the color correction functions (e.g., look up tables) into a video card of the system to perform color correction for the display device of the system.

Thus, in at least one embodiment of the present invention, pseudo-native device information is generated for a color display device (e.g., an LCD display panel) such that when a single, unique system function for color management is applied on the pseudo-native device information, a customized look up table for gamma correction in a video card is generated. The customized look up table is calibrated for the optimization of color rendering for skin tone in one range of a color parameter (e.g., a medium luminance region) while maintaining the gray colors for the user interface elements in another range of the color parameter (e.g., a high luminance region). The pseudo-native device information is included (or supplied) in the color profile for the color device as the native device information that specifies the characteristics of the device. Thus, the color correction is performed using the generated customized look up table in the video card in real time without any hardware changes. Since the pseudo-native device information is based on the algorithm of the single system function for color management, no modification of the existing system function is required to provide the customized color correction, which is not a part of the algorithm of the single system function. No additional hardware is required to implement these methods. Further, the various methods of the present invention can be used with any types of color devices, such as computer display devices and others.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to determine color correction for a device, the method comprising:

combining first color correction functions and second color correction functions to generate third color correction functions respectively for color components of a first color space, the first color correction functions being calibrated together for the color components respectively for the device for a first plurality of colors that are associated with a color parameter of a plurality of values, wherein said combining comprises averaging the first and second color correction functions with weights to generate the third color correction functions; and normalizing the first and second color correction functions with respect to fourth color correction functions before said averaging.

2. A method as in claim 1, wherein the second color correction functions are calibrated for the device for a second plurality of colors that are associated with a color parameter of a plurality of values.

3. A method as in claim 1, wherein the first plurality of colors comprise grays in a first range of the color parameter and skin tone colors in a second range of the color parameter.

4. A machine readable medium containing executable computer program instructions which when executed by a data processing system cause said system to perform a method to determine color correction for a device, the method comprising:

combining first color correction functions and second color correction functions to generate third color correction functions respectively for color components of a first color space, the first color correction functions being calibrated together for the color components respectively for the device for a first plurality of colors that are associated with a color parameter of a plurality of values, wherein said combining comprises averaging the first and second color correction functions with weights to generate the third color correction functions; and normalizing the first and second color correction functions with respect to fourth color correction functions before said averaging.

5. A medium as in claim 4, wherein the second color correction functions are calibrated for the device for a second plurality of colors that are associated with a color parameter of a plurality of values.

6. A medium as in claim 4, wherein the first plurality of colors comprise grays in a first range of the color parameter and skin tone colors in a second range of the color parameter.

7. A data processing system to determine color correction for a device, the data processing system comprising:

means for combining first color correction functions and second color correction functions to generate third color correction functions respectively for color components of a first color space, the first color correction functions being calibrated together for the color components respectively for the device for a first plurality of colors that are associated with a color parameter of a plurality of values, wherein said means for combining comprises means for averaging the first and second color correction functions with weights to generate the third color correction functions; and means for normalizing the first and second color correction functions with respect to fourth color correction functions before averaging the first and second color correction functions.

8. A data processing system as in claim 7, wherein the second color correction functions are calibrated for the device for a second plurality of colors that are associated with a color parameter of a plurality of values.

9. A data processing system as in claim 7, wherein the first plurality of colors comprise grays in a first range of the color parameter and skin tone colors in a second range of the color parameter.

* * * * *